(12) United States Patent
Nori et al.

(10) Patent No.: US 12,405,890 B2
(45) Date of Patent: Sep. 2, 2025

(54) METHOD AND APPARATUS FOR LEVERAGING SIMULTANEOUS MULTITHREADING FOR BULK COMPUTE OPERATIONS

(71) Applicant: Intel Corporation, Santa Clara, CA (US)

(72) Inventors: Anant Nori, Bangalore (IN); Rahul Bera, Zürich (CH); Shankar Balachandran, Bangalore (IN); Joydeep Rakshit, Bengaluru (IN); Om Ji Omer, Bangalore (IN); Sreenivas Subramoney, Bangalore (IN); Avishaii Abuhatzera, Amir (IL); Belliappa Kuttanna, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 17/561,571

(22) Filed: Dec. 23, 2021

(65) Prior Publication Data
US 2023/0205692 A1 Jun. 29, 2023

(51) Int. Cl.
*G06F 12/0811* (2016.01)
*G06F 9/30* (2018.01)
(Continued)

(52) U.S. Cl.
CPC ........ *G06F 12/0811* (2013.01); *G06F 9/3012* (2013.01); *G06F 9/3851* (2013.01);
(Continued)

(58) Field of Classification Search
CPC ............ G06F 12/0811; G06F 12/0842; G06F 12/0888; G06F 2209/509;
(Continued)

(56) References Cited

U.S. PATENT DOCUMENTS

2017/0097891 A1* 4/2017 Shaikh .................. G06F 9/3004
2019/0004810 A1 1/2019 Jayasimha et al.
(Continued)

OTHER PUBLICATIONS

Aga et al., "Compute Caches", IEEE International Symposium on High Performance Computer Architecture, 2017, pp. 481-492.
(Continued)

*Primary Examiner* — Hashem Farrokh
(74) *Attorney, Agent, or Firm* — Nicholson De Vos Webster & Elliott LLP

(57) ABSTRACT

Apparatus and method for leveraging simultaneous multithreading for bulk compute operations. For example, one embodiment of a processor comprises: a plurality of cores including a first core to simultaneously process instructions of a plurality of threads; a cache hierarchy coupled to the first core and the memory, the cache hierarchy comprising a Level 1 (L1) cache, a Level 2 (L2) cache, and a Level 3 (L3) cache; and a plurality of compute units coupled to the first core including a first compute unit associated with the L1 cache, a second compute unit associated with the L2 cache, and a third compute unit associated with the L3 cache, wherein the first core is to offload instructions for execution by the compute units, the first core to offload instructions from a first thread to the first compute unit, instructions from a second thread to the second compute unit, and instructions from a third thread to the third compute unit.

24 Claims, 27 Drawing Sheets

(51) Int. Cl.
G06F 9/38 (2018.01)
G06F 9/48 (2006.01)
G06N 3/02 (2006.01)

(52) U.S. Cl.
CPC .......... G06F 9/3888 (2023.08); G06F 9/4881 (2013.01); G06N 3/02 (2013.01)

(58) Field of Classification Search
CPC ..... G06F 2212/1008; G06F 2212/1024; G06F 2212/454; G06F 9/30043; G06F 9/3012; G06F 9/3851; G06F 9/3877; G06F 9/3888; G06F 9/3891; G06F 9/4881; G06N 3/02; G06N 3/045; G06N 3/0464; G06N 3/063
USPC .......................................................... 711/119
See application file for complete search history.

(56) References Cited

U.S. PATENT DOCUMENTS

| | | | |
|---|---|---|---|
| 2020/0301733 A1* | 9/2020 | Zhang | G06F 9/4843 |
| 2021/0303357 A1* | 9/2021 | Varma | G06F 9/4812 |
| 2022/0100514 A1 | 3/2022 | Nori et al. | |

OTHER PUBLICATIONS

Carlson et al., "The Sniper User Manual", Sniper, Nov. 13, 2013, 39 pages.
Eckert et al., "Neural Cache: Bit-Serial In-Cache Acceleration of Deep Neural Networks", ACM/IEEE 45th Annual International Symposium on Computer Architecture, 2018, pp. 383-396.
Feichtenhofer et al., "Convolutional Two-Stream Network Fusion for Video Action Recognition", IEEE Conference on Computer Vision and Pattern Recognition, CVPR 2016, 9 pages.
He et al., "Deep Residual Learning for Image Recognition", 2016 IEEE Conference on Computer Vision and Pattern Recognition, CVPR 2016, pp. 770-778.
Howard et al., "MobileNets: Efficient Convolutional Neural Networks for Mobile Vision Applications", CoRR, Apr. 17, 2017, pp. 1-10.
Huang et al., "Densely Connected Convolutional Networks", IEEE Conference on Computer Vision and Pattern Recognition, 2017, 9 pages.
IDF AC9494, "Loop Support Extensions—Late unrolling of loops on CPUs for data parallel algorithms like DNN inference", filed Sep. 2020, 9 pages.
Intel, "Improving Real-Time Performance by Utilizing Cache Allocation Technology Enhancing Performance via Allocation of the Processor's Cache", White Paper, Apr. 2015, Document No. 331843-001US, pp. 1-16.
LLVM/OpenMP, "LLVM/OpenMP 21.0.ogit documentation", available online at <https://openmp.llvm.org/index.html>, 2025, 2 pages.
Lockerman et al., "Livia: Data-Centric Computing Throughout the Memory Hierarchy", ASPLOS '20, Mar. 16-20, 2020, 18 pages.
Mutlu et al., "Processing Data Where It Makes Sense: Enabling In-Memory Computation", Mar. 10, 2019, 21 pages.
Rodriguez et al., "Lower numerical precision deep learning inference and training," Intel White Paper, 2018, pp. 1-19.
Vaswani et al., "Attention Is All You Need", Advances in Neural Information Processing Systems 30: Annual Conference on Neural Information Processing Systems 2017, Dec. 4-9, 2017, 11 pages.
Xie et al., "Aggregated Residual Transformations for Deep Neural Networks", IEEE Conference on Computer Vision and Pattern Recognition, CVPR, Jul. 21-26, 2017, pp. 5987-5995.

* cited by examiner

| Instructions (LSX enabled Kernel) | Comments |
|---|---|
| ❖ LSXLoopStart | Flushes LSX Code Register in the core |
| ❖ LSXLoopCount 2 | Sets total expected loops to 2 |
| (Loop Iteration Calculation into R0) | Baseline ISA. Executed in the core. |
| ❖ LSXLoop Iteration 1, R0 | Sets iteration count of outer loop (loop1) to calc.value |
| (Loop Iteration Calculation into R0) | Baseline ISA. Executed in the core. |
| ❖ LSXLoop Iteration 2, R0 | Sets iteration count of inner loop (loop2) to calc.value |
| (Loop Iteration Calculation into R0) | Baseline ISA. Executed in the core. |
| Load$^{LSX}$ Weight R1 ← [A$_1$ + Δ$_1$] | LSX instruction to be unrolled and executed |
| ❖ LSXLoopDisable 2 | Disables outer loop for previously allocated LSX Instr |
| BaseAddress Calculation into R0) | Baseline ISA. Executed in the core. |
| ❖ LSXBaseAddress R0 | Sets BaseAddress for previously allocated LSX Instr |
| (Stride Calculation into R0) | Baseline ISA. Executed in the core. |
| ❖ LSCStride 1, R0 | Sets stride for loop1 of previously allocated LSX Instr to calc. value |
| . . . | |
| MAC$^{LSX}$ R{6+ δ +θ} += R1, R5 | LSX instruction to be unrolled and executed |
| ❖ LSXRegStride 2, 4 | Dest. register id. To be incremented by 4 every inner loop (loop2) |
| . . . | |
| ❖ LSXLoopEnd | Begin unrolling and execution of LSX instructions |

FIG. 4

```
┌─────────────────────────────────────────────────────────────────┐
│ FETCH AN INSTRUCTION HAVING FIELDS INCLUDING A FIELD AN OPCODE  │
│ TO INDICATE ONE OF THE LSX OPERATIONS (SUCH AS PROVIDING LSX    │
│ METADATA TO BE USED BY LSX-ENABLED INSTRUCTIONS, BEGINNING A    │
│ LSX LOOP, AND ENDING AN LSX LOOP)                               │
│ 601                                                             │
└─────────────────────────────────────────────────────────────────┘
                                │
                                ▼
┌─────────────────────────────────────────────────────────────────┐
│ TRANSLATE THE INSTRUCTION 602                                   │
└─────────────────────────────────────────────────────────────────┘
                                │
                                ▼
┌─────────────────────────────────────────────────────────────────┐
│ DECODE THE INSTRUCTION OR TRANSLATED VARIANT 603                │
└─────────────────────────────────────────────────────────────────┘
                                │
                                ▼
┌─────────────────────────────────────────────────────────────────┐
│ RETRIEVE DATA ASSOCIATED WITH THE SOURCE OPERANDS AND QUEUE 605 │
└─────────────────────────────────────────────────────────────────┘
                                │
                                ▼
┌─────────────────────────────────────────────────────────────────┐
│ EXECUTE THE DECODED INSTRUCTION OR TRANSLATED VARIANT TO        │
│ PERFORM ONE OR MORE OPERATIONS AS DIRECTED BY THE OPCODE (SUCH  │
│ AS PROVIDING LSX METADATA TO BE USED BY LSX-ENABLED             │
│ INSTRUCTIONS, BEGINNING A LSX LOOP, AND ENDING AN LSX LOOP)     │
│ 607                                                             │
└─────────────────────────────────────────────────────────────────┘
                                │
                                ▼
┌─────────────────────────────────────────────────────────────────┐
│ COMMIT A RESULT OF THE EXECUTED INSTRUCTION                     │
│ 609                                                             │
└─────────────────────────────────────────────────────────────────┘
```

FIG. 6

```
┌─────────────────────────────────────────────────────────────────────┐
│ FETCH AN INSTRUCTION HAVING FIELDS INCLUDING A FIELD AN OPCODE TO   │
│ INDICATE ONE OF THE LSX-ENABLED OPERATIONS (SUCH AS AN ARITHMETIC,  │
│ BOOLEAN, LOAD, STORE, ETC. OPERATION WITHIN AN LSX LOOP)  701       │
└─────────────────────────────────────────────────────────────────────┘
                                   │
                                   ▼
┌─────────────────────────────────────────────────────────────────────┐
│                   TRANSLATE THE INSTRUCTION 702                     │
└─────────────────────────────────────────────────────────────────────┘
                                   │
                                   ▼
┌─────────────────────────────────────────────────────────────────────┐
│              DECODE THE INSTRUCTION OR TRANSLATED VARIANT 703       │
└─────────────────────────────────────────────────────────────────────┘
                                   │
                                   ▼
┌─────────────────────────────────────────────────────────────────────┐
│      RETRIEVE DATA ASSOCIATED WITH THE SOURCE OPERANDS AND          │
│                         SCHEDULE 705                                │
└─────────────────────────────────────────────────────────────────────┘
                                   │
                                   ▼
┌─────────────────────────────────────────────────────────────────────┐
│ EXECUTE THE DECODED INSTRUCTION OR TRANSLATED VARIANT TO PERFORM    │
│ ONE OR MORE OPERATIONS AS DIRECTED BY THE OPCODE (SUCH AS AN        │
│ ARITHMETIC, BOOLEAN, LOAD, STORE, ETC. OPERATION WITHIN AN LSX LOOP)│
│                              707                                    │
└─────────────────────────────────────────────────────────────────────┘
                                   │
                                   ▼
┌─────────────────────────────────────────────────────────────────────┐
│             COMMIT A RESULT OF THE EXECUTED INSTRUCTION             │
│                              709                                    │
└─────────────────────────────────────────────────────────────────────┘
```

FIG. 7

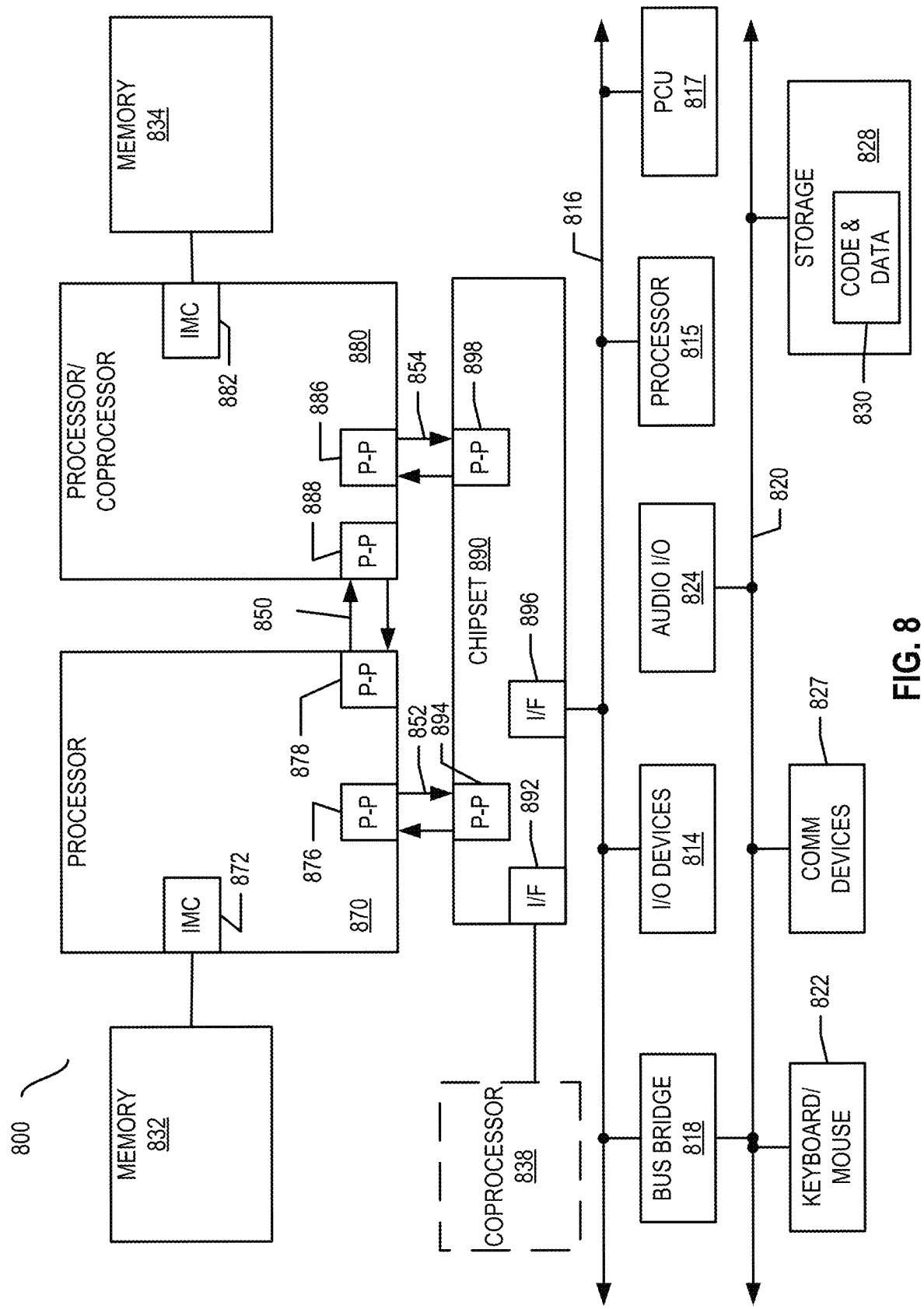

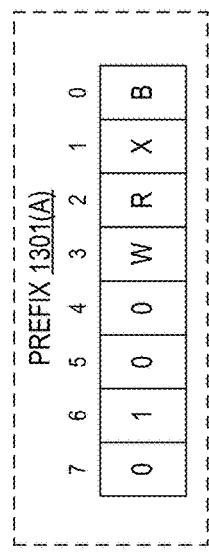
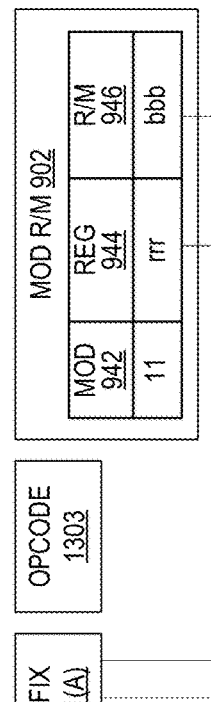
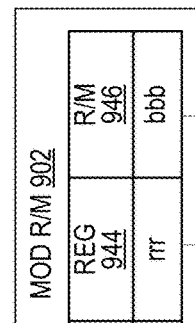
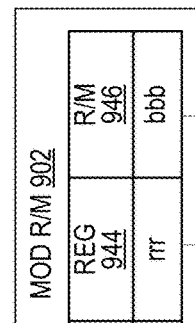
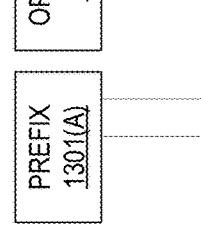

```
parallel for i1 in range (I1Lb, I1ub)...
  for i2 in range (I2Lb, I2ub)...
    for i3 in range (I3Lb, I3ub)...
      .
      .
      .
      OutputTensor[i1] += ...
```

METHOD AND APPARATUS FOR LEVERAGING SIMULTANEOUS MULTITHREADING FOR BULK COMPUTE OPERATIONS

BACKGROUND

Field of the Invention

The following are example implementations of different embodiments of the invention. This invention relates generally to the field of computer processors. More particularly, the invention relates to a method and apparatus for leveraging SMT for bulk compute operations.

Description of the Related Art

While general purpose central processing units (CPUs), with their rich and mature ecosystem of tools, high performance libraries and programming models, offer unique attractive advantages for deep neural network (DNN) inference at both data center and edge, there remain significant opportunities to improve power and performance/Watt. CPUs unroll every instance of every instruction in each iteration of all loops into almost every stage of the CPU pipeline. Despite the structured, repetitive and loopy behavior of data parallel DNN kernels, all instructions go through power-hungry fetch, decode, wide allocation and wide dispatch stages of CPU pipeline.

BRIEF DESCRIPTION OF DRAWINGS

Various embodiments in accordance with the present disclosure will be described with reference to the drawings, in which:

FIG. 4 illustrates an example of executing a loop using embodiments of LSX instructions and LSX-enabled instructions.

FIG. 6 illustrates an embodiment of method performed by a processor to process one or more of the LSX instructions.

FIG. 7 illustrates an embodiment of method performed by a processor to process one or more of the LSX-enabled instructions.

FIG. 8 illustrates embodiments of an exemplary system.

FIG. 15 illustrates embodiments of a first prefix.

FIGS. 16(A)-(D) illustrate embodiments of how the R, X, and B fields of the first prefix are used.

FIG. 20 illustrates an example of a parallel block of source code comprising nested loops.

DETAILED DESCRIPTION

The present disclosure relates to methods, apparatus, systems, and non-transitory computer-readable storage media for not utilizing all of a compute pipeline for certain instructions.

Figure 1:
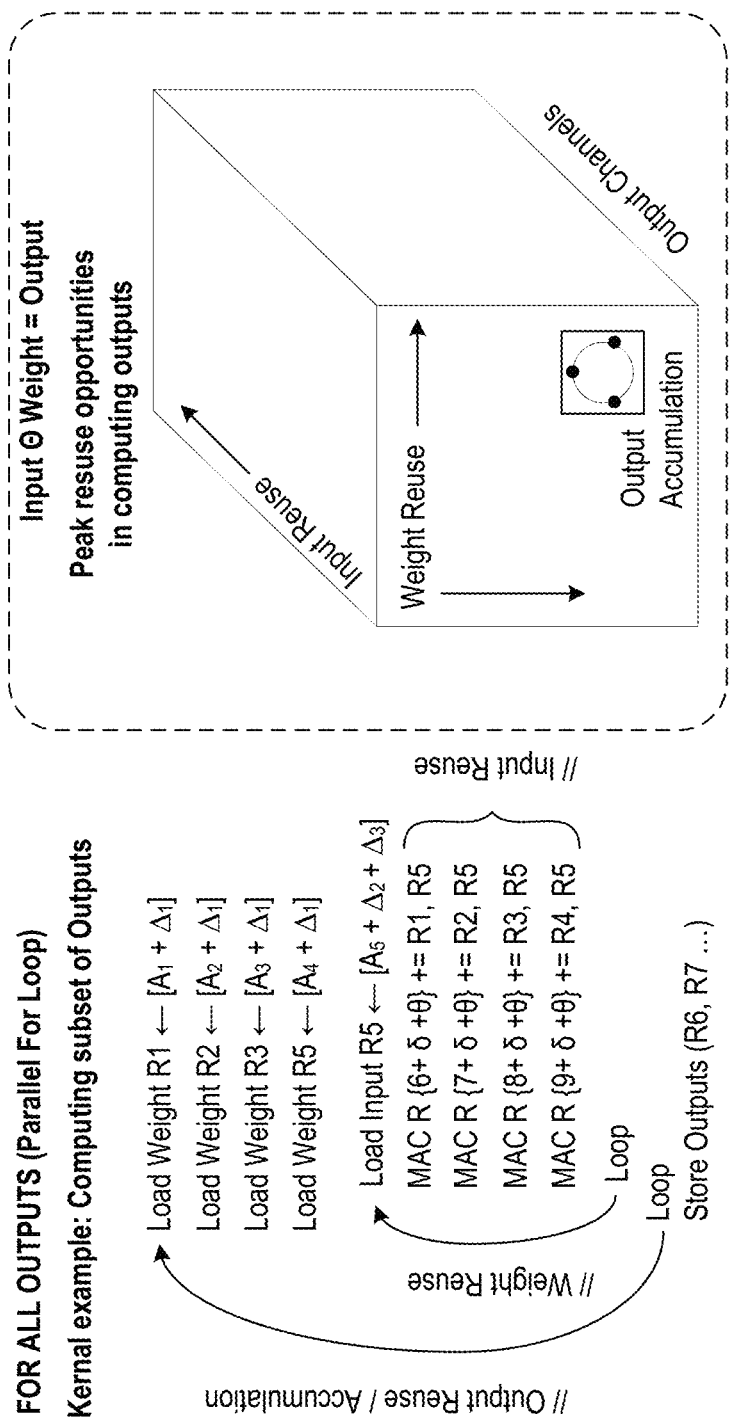
FIG. 1 illustrates embodiments of instructions of a DNN kernel including a loop.

FIG. 1 illustrates embodiments of instructions of a DNN kernel including a loop. As shown, all instances of the instructions go through power-hungry fetch, decode, wide allocation, and wide dispatch stages of a CPU pipeline. These states tend to dominate total power consumed by the CPUs for these types of kernels and similar code. In the current state of the art, there are no solutions that directly address the issue of unrolling fixed iteration count loops into all stages of the CPU pipeline. Rather, previous CPU optimizations only partly address the core issue of unrolling multiple nested fixed iteration count loops through all stages of a CPU pipeline.

Detailed herein are instructions that may be considered to form an instruction set architecture set (ISA) extension to address, at the least, the need to send all instances of instructions through all the CPU pipeline stages. In particular, a set of one or more instructions form a Loop Support ISA Extension (LSX) that may be used to encode metadata that captures the loop-y fixed iteration count nature of some applications (such as data parallel DNN kernels).

The kinds of metadata (and their typical ranges) that may be captured may include, but are not limited to: a number of loops, a number of iterations per loop, valid loops per instruction (to support nesting), base addresses, and address and register strides. Once kernels are expressed using these LSX instructions, multiple loops of instructions are fetched, decoded, and allocated only once by the CPU. The identified metadata is calculated and then populated into appropriate fields of LSX enabled instructions (e.g., addressing information, etc.) or otherwise used by a scheduler (e.g., to indicate an iteration of a loop, an iteration type, etc.). Further unrolling and execution is handled by a simple scheduler. This effectively bypasses the power-hungry stages of the CPU for most of the execution, enabling significant power savings. Note that the LSX instructions may be beneficial for non-loop-y code including matrix manipulation tasks.

Figure 2:
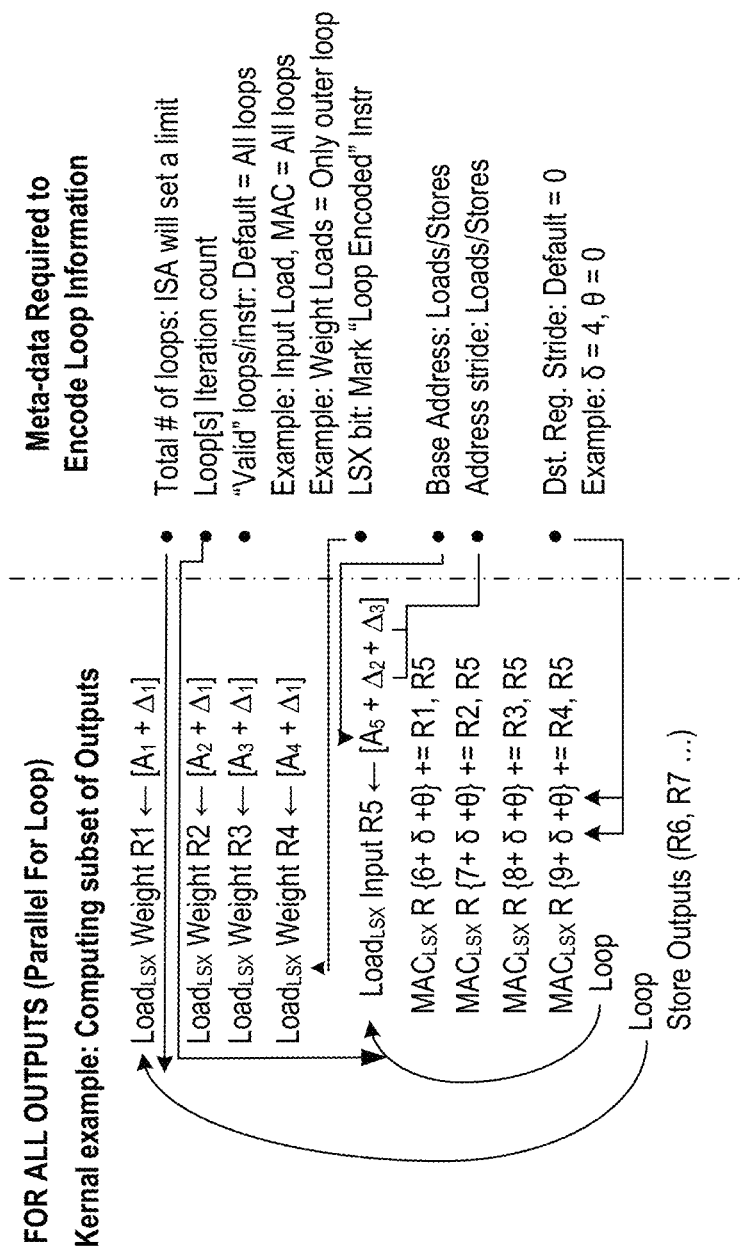
FIG. 2 illustrates embodiments of instructions of a DNN kernel including a loop.

FIG. 2 illustrates embodiments of instructions of a DNN kernel including a loop. As shown, collectively these instructions have metadata associated with them. In particular, metadata that is important to know may include, but is not limited to a number it items detailed herein. A goal is to bypass the power-hungry front-end and other stages of the CPU pipeline as much as possible, with unrolling of pre-decoded work as close as possible to the execution units.

In some embodiments, the metadata includes a number of loops in the code and/or a count of loop iterations. In some embodiments, the ISA sets a limit on the maximum number of loops encoded.

In some embodiments, it is important to know for each instruction the set of loops the instruction resides within. This may be used, for example, by an unroll scheduler. In the example of FIG. 2, weight loads are only executed in the outer loop, whereas inputs are loaded once in every iteration of the inner loop.

In some embodiments, loads and stores need a base address as well as an address stride for each loop they reside in. For DNNs, these can be computed since the DNN primitive implementation employs structured data layouts to maximize cache port width and capacity.

In some embodiments, data dependence is made through registers. Hence, stride values per loop for destination register IDs are needed as well. In the example of FIG. 2, iterations of the innermost loop reuses weights (being loaded in the outer loop) to compute different output elements that need to be stored in different registers. Here, the destination register ID stride is determined by the number of outputs computed in the innermost loop (example=4).

Kernel instructions are tagged with LSX indication (e.g., bit) that denotes late unrolled execution and are decoded and allocated into LSX code storage (such as LSX code registers).

In the particular example of FIG. 2, there is a 1×1 convolution where every weight element is reused across all input plane elements in the same input channel to calculate different output plane elements. The input elements per input channel are reused across all weights in the same input channel, but in a different output channel (to form different output channel elements). Output elements see reuse due to multiply-accumulate operations across multiple input and weight elements. The software kernel implementing this convolution basically implements a number of nested loops of loads and computes. The loops capture reuse of various data elements and the number of instructions within the loop as well as number of loops are typically bounded by the number of architecturally exposed registers in the CPU or core. In the example in FIG. 2, the number of weight loads (reused across inputs in the inner-most loop) and the number of iterations of the innermost loop (reusing weights to compute different outputs) is governed by the register size, wherein data dependence is expressed through registers.

The generation of the metadata is accomplished using one of a plurality of instructions as shown in the table below:

| Opcode Mnemonic | Operands (if any) and type | Description of Execution |
|---|---|---|
| LSXLoopStart | | The execution causes a flush of LSX code storage |
| LSXLoopEnd | | The execution marks the readiness for unrolled execution of LSX tagged instructions once all the previous LSX instructions that populate metadata have been executed (see below for metadata population instructions). |
| LSXLoopCount | SRC1 = REGISTER (REG)/MEMORY LOCATION (MEM)/IMMEDIATE (IMM) | SRC1 (source 1) stores a loop count value; The execution causes loop count metadata to be set to be the value in SRC1. |
| LSXLoopIteration | SRC1 = REG/MEM/IMM; SRC2 = REG/MEM/IMM | SRC1 stores an iteration count; SRC2 stores a loop indication; The execution causes iteration count metadata to be set for loop indicated by SRC2. |
| LSXLoopDisable | SRC1 = REG/MEM/IMM; | SRC1 stores an indication of a loop number (e.g., outerloop 1, innerloop 2, innerloop 3, etc.); The execution causes the loop indicated in SRC1 to be disabled. |
| LSXBaseAddress | SRC1 = REG/MEM; | SRC1 stores a base address value; The execution causes the base address as stored in SRC1 to be set for a LSX-enabled instruction in the instruction flow. In some embodiments, the LSX-enabled instruction that uses this base address precedes the LSXBaseAddress instruction. |
| LSXStride | SRC1 = REG/MEM/IMM; SRC2 = REG/MEM/IMM; | SRC1 stores a stride value; SRC2 stores an indication of the loop number whose stride is to be set as the value stored in SRC1; and The execution sets metadata for the indicated stride for the indicated loop. In some embodiments, the LSX-enabled instruction that uses this stride precedes the LSXStride instruction. |
| LSXRegStride | SRC1 = REG/MEM/IMM; SRC2 = REG/MEM/IMM | SRC1 stores a first stride value; SRC2 stores an indication of a second stride value, wherein the first and second stride values are to be used to update a destination register identifier (e.g., a logical or physical register ID) - see θ and δ in FIGS. 1 and 2; and The execution sets metadata for a destination register increment strides. In some embodiments, the LSX-enabled instruction that uses this stride information precedes the LSXRegStride instruction. |

Figure 3:
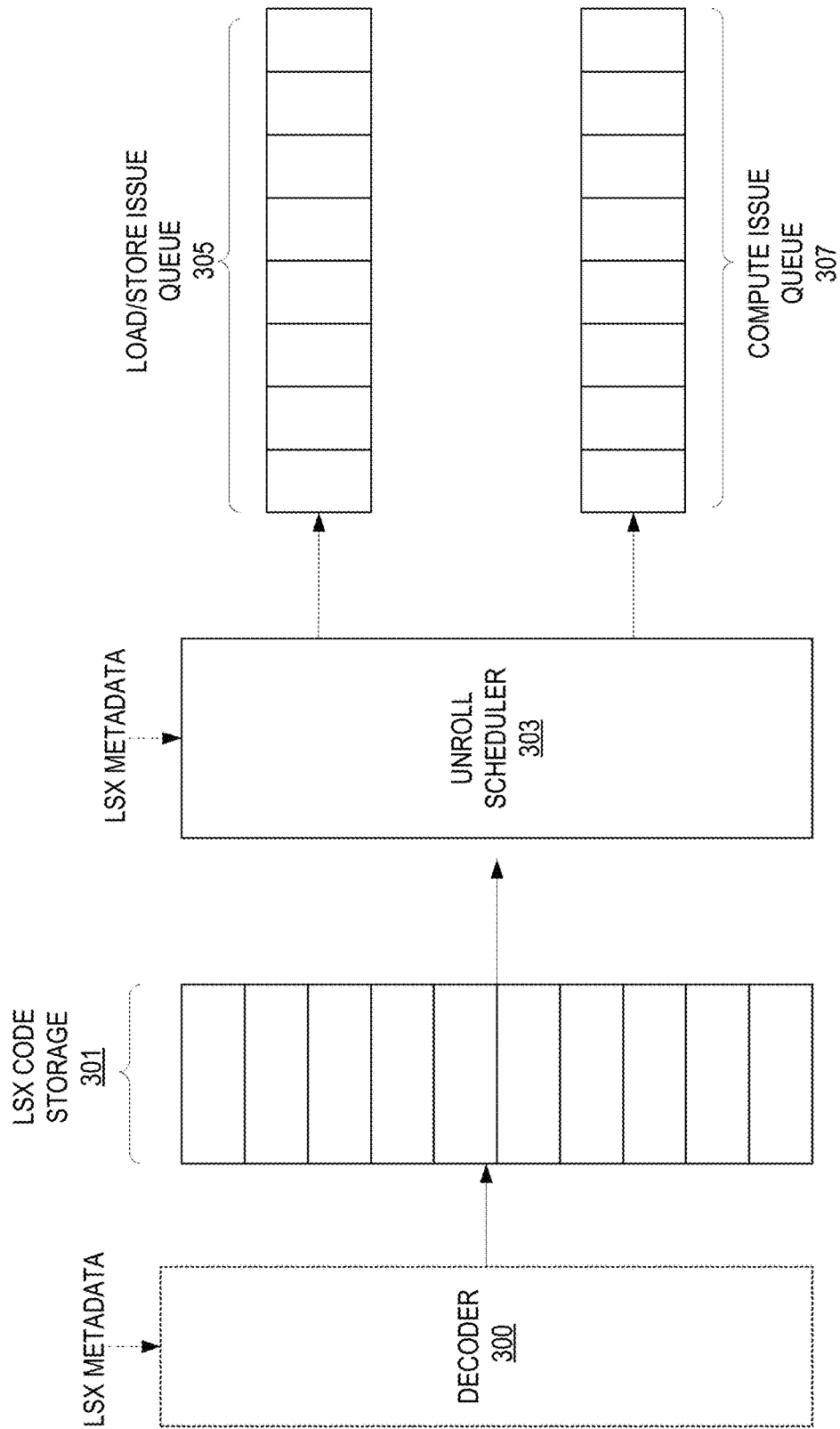
FIG. 3 illustrates embodiments of hardware to assist in supporting LSX instructions and LSX-enabled instructions.

FIG. 3 illustrates embodiments of hardware to assist in supporting LSX instructions and LSX-enabled instructions. Instructions that would be within a loop that is defined by LSX instructions are referred to herein as LSX-enabled instructions. For example, the load and multiply accumulate (MAC) instructions illustrated in other figures are LSX-enabled. In some embodiments, these instructions are tagged as being a part of a LSX defined loop. This indication may be a bit appended to the instructions. As such, the semantics of the "normal" instruction are the same (same opcode, same operands, etc.), with an additional bit appended. In some embodiments, a prefix of an instruction format indicates that the instruction is LSX-enabled (with the opcode, etc. not changing). In some embodiments, the LSX-enabled instructions are no different than their normal counterparts, but are merely steered into the LSX code storage 301.

A decoder 301 decodes LSX and LSX-enabled instructions and places them in LSX code storage 301 based on one or more of the opcode of the instruction and an indication that the instruction is LSX-enabled (e.g., using a bit in a prefix, input from an unroller or loop stream detector, etc.). In some embodiments, the decoder 301 uses LSX metadata to update operands of LSX-enabled instructions.

The LSX code storage 301 stores LSX enabled instructions that will be unrolled using an unroll scheduler 303. In some embodiments, the LSX code storage 301 is a register file. In some embodiments, the register file is a part of a larger register file. In some embodiments, the LSX code storage 301 includes at least 32 entries.

The unroll scheduler 303 unrolls the loop as dictated by the LSX instructions (and metadata) and places instructions from the LSX code storage 301 into one or more issue queues 305 and 307. In some embodiments, the unroll scheduler 303 is a part of a loop stream detector. Note that the unrolling and scheduling may cause multiple instances of a decoded instruction stored in LSX code storage 301 to be placed into an issue queue. For example, the same decoded instruction may be placed into an issue queue per loop iteration without having to re-decode. The unroll scheduler 303 also uses the loop count and iterations to determine which instructions are to be duplicated and how many times.

A first of the queues is a load/store queue 305 which temporarily stores loads and/or stores to execute. The second of the queues is a compute queue 305 which stores non-load/store instructions (e.g., Boolean, arithmetic, etc.). In some embodiments, the unroll scheduler 303 uses LSX metadata to update operands (e.g., addressing, etc.) of LSX-enabled instructions prior to placement in one of the queues 305 and 307. In some embodiments, one or more of the queues 305 and 307 is an in-order queue. The use of in-order queues allows loads to jump over compute (which may hide load latency).

FIG. 4 illustrates an example of executing a loop using embodiments of LSX instructions and LSX-enabled instructions. In this example, the LSX kernel code starts with an execution of a LSXLoopStart instruction which flushes the LSX code storage 301.

The next LSX instruction is a LSXLoopCount instruction which sets the total expected loops to be 2. Depending on the implementation, the "2" value may be stored in a register or memory identified by one or more fields of the LSXLoopCount instruction, or encoded in an immediate of the LSXLoopCount instruction.

A normal ISA instruction is sued to calculate a loop iteration count and store that value in register R0.

Next is a LSXLoopIteration instruction which sets the iteration count for loop 1 to be the value stored in R0. Depending on the implementation, the loop identifier may be encoded in an immediate, or stored as a value in a register or memory.

A normal ISA instruction is used to calculate a second loop iteration count and store that value in register R0.

Another LSXLoopIteration instruction follows which sets the iteration count for loop 2 to be the value stored in R0. Depending on the implementation, the loop identifier may be encoded in an immediate, or stored as a value in a register or memory.

At this point, an LSX-enabled instruction is decoded and stored in the LSX code storage 301 (and, in some embodiments, decoded). This LSX-enabled instruction will be unrolled and scheduled using unroll scheduler 303 prior to execution. In particular, this instruction is a load instruction in this example. Note that the base address will be set by an execution of a subsequent LSXBaseAddress instruction which generates that metadata. Examples of how to identify an LSX-enable instruction have been discussed earlier.

A LSXLoopDisable instruction follows and its execution disables the identified loop (here loop 2). Depending on the implementation, the loop identifier may be encoded in an immediate, or stored as a value in a register or memory.

A normal ISA instruction is used to calculate a base address and store that value in register R0.

A LSXBaseAddress instruction sets the base address to be used by the LSX-enabled load instruction using the value stored in R0. In the example of FIG. 2 this is the $A_1$.

A normal ISA instruction is used to calculate a stride value and store that value in register R0.

A LSXStride sets the stride value for loop 1 using the stride value of R0. In the example of FIG. 2 this is the $\Delta_1$.

The . . . indicates a plurality of instructions that are included in the flow (see FIG. 2) until the first MAC that is to be decoded and stored in LSX code storage 301, and later unrolled executed. This MAC instruction utilizes two stride values to set the destination register which are provided by the LSXRegStride instruction. For example, 2 and 4 are the $\theta$ and $\delta$ strides.

The second . . . indicates a plurality of instructions that are included in the flow after the first MAC (see FIG. 2). The final instruction is a LSXLoopEnd instruction which cause the LSX-enabled instructions to be unrolled, queued, and executed.

Figure 5:
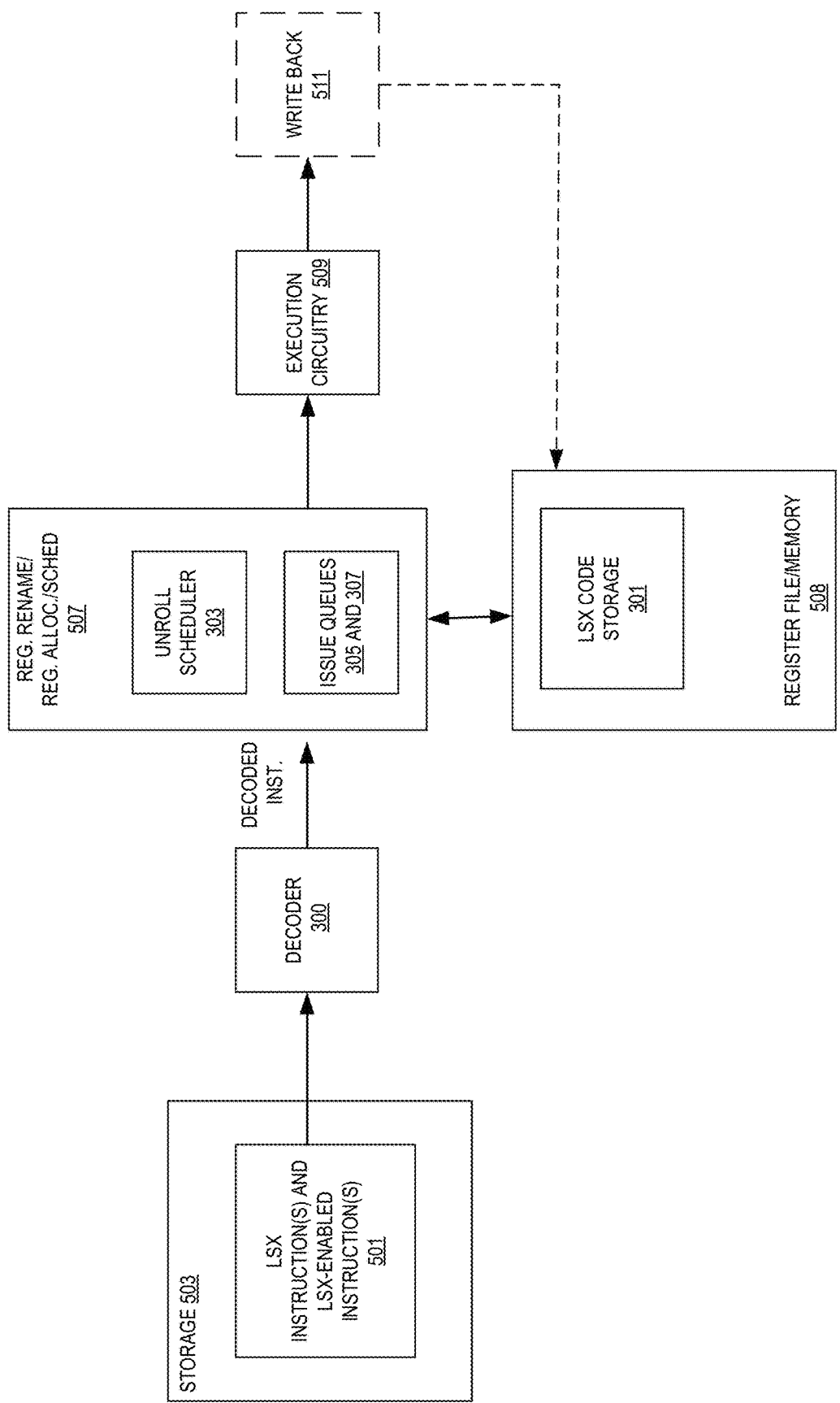
FIG. 5 illustrates embodiments of hardware to process an instruction such as the LSX instructions and LSX-enabled instructions.

FIG. 5 illustrates embodiments of hardware to process an instruction such as the LSX instructions and LSX-enabled instructions. Note that many of these components are also detailed in at least FIG. 10(B).

As illustrated, storage 503 stores LSX instructions and LSX-enabled instructions 501 to be executed.

The LSX instructions and LSX-enabled instructions 501 are received by decode circuitry 505. For example, the decode circuitry 300 receives the instructions from fetch logic/circuitry.

Each LSX instruction and LSX-enable instruction at least includes a field for an opcode to indicate one or more operations to perform. Further, some embodiments of the LSX instructions and LSX-enable instructions utilize one or more fields to indicate sources, destinations, addresses, etc. Examples of embodiments of instruction formats, and aspects thereof, for these instructions are found in FIGS. 13-18.

Decode circuitry 300 decodes the instruction into one or more operations. In some embodiments, this decoding includes generating a plurality of micro-operations to be performed by execution circuitry (such as execution circuitry 509). The decode circuitry 300 also decodes instruction prefixes.

In some embodiments, register renaming, register allocation, and/or scheduling circuitry 507 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments). In some embodiments, the register renaming, register allocation, and/or scheduling circuitry 507 includes an unroll scheduler 303 and issue queues 305 and 307.

Registers (register file) and/or memory 508 store data as operands of the instruction to be operated on by execution circuitry 509. Exemplary register types include packed data registers, general purpose registers, and floating-point registers. In some embodiments, the registers (register file) and/or memory 508 includes LSX code storage 301.

Execution circuitry 509 executes the decoded instructions. Exemplary detailed execution circuitry is shown in FIG. 10, etc. The execution of the decoded instruction causes the execution circuitry to perform the operation(s) indicated by the opcode of the instruction. For example, the LSX operation(s).

In some embodiments, retirement/write back circuitry 511 architecturally commits the destination register into the registers or memory 508 and retires the instruction.

FIG. 6 illustrates an embodiment of method performed by a processor to process one or more of the LSX instructions. For example, a processor core as shown in FIG. 10(B), a pipeline as detailed below, aspects of the hardware of FIG. 3, etc. perform aspects this method.

At 601, an instruction is fetched. For example, a LSXLoopStart, LSXLoopEnd, LSXLoopCount, LSXLoopIteration, LSXLoopDisable, LSXBaseAddress, LSXStride, or LSXRegStride stride instruction. Details of these instructions have been discussed above.

In some embodiments, the fetched instruction is translated into one or more instructions of a second ISA at 602.

The fetched instruction (or translated variant) is decoded at 603.

Data values associated with the source operands of the decoded instruction are retrieved as needed at 605. For example, when one or more of the source operands are memory operands, the data from the indicated memory location is retrieved.

At 607, the decoded instruction is executed by execution circuitry (hardware) such as that detailed herein. As noted above, the execution of LSX instructions configures LSX execution including clearing storage, generating metadata, disabling a loop, and causing unrolling and execution of LSX-enabled instructions.

In some embodiments, the instruction is committed or retired at 609.

FIG. 7 illustrates an embodiment of method performed by a processor to process one or more of the LSX-enabled instructions. For example, a processor core as shown in FIG. 10(B), a pipeline as detailed below, aspects of the hardware of FIG. 3, etc. perform aspects this method.

At 701, an LSX-enabled instruction is fetched. This instruction includes fields including a field an opcode to indicate one of the LSX-enabled operations (such as an arithmetic, Boolean, load, store, etc. operation within an LSX loop). Details of these instructions have been discussed above including how to identify such an instruction.

In some embodiments, the fetched instruction is translated into one or more instructions of a second ISA at 702.

The fetched instruction (or translated variant) is decoded at 703. In some embodiments, depending on the LSX-enabled instruction to execute, metadata from LSX instructions is populated into one or more operands of the LSX-instruction at this point. Decoded LSX-enabled instructions are also stored in LSX code storage 301.

Data values associated with the source operands of the decoded instruction are retrieved as needed and the instruction is queued for execution at 705. For example, when one or more of the source operands are memory operands, the data from the indicated memory location is retrieved. Note that the data values of the source operands (and destination register ID) may be updated using metadata from LSX instructions. Note that multiple instances of the same instruction (such as per loop iteration) may be scheduled without having to re-decode. For example, the same decoded instruction may be placed into an issue queue per loop iteration without having to re-decode.

At 707, the decoded instruction is executed by execution circuitry (hardware) such as that detailed herein. As noted above, the execution of LSX-enabled instructions performs more traditional operations such as load, store, arithmetic, Boolean, etc. operations within a LSX loop discussed above.

In some embodiments, the instruction is committed or retired at 709.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 8 illustrates embodiments of an exemplary system. Multiprocessor system 800 is a point-to-point interconnect system and includes a plurality of processors including a first processor 870 and a second processor 880 coupled via a point-to-point interconnect 850. In some embodiments, the first processor 870 and the second processor 880 are homogeneous. In some embodiments, first processor 870 and the second processor 880 are heterogenous.

Processors 870 and 880 are shown including integrated memory controller (IMC) units circuitry 872 and 882, respectively. Processor 870 also includes as part of its interconnect controller units' point-to-point (P-P) interfaces 876 and 878; similarly, second processor 880 includes P-P interfaces 886 and 888. Processors 870, 880 may exchange information via the point-to-point (P-P) interface 850 using P-P interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with a coprocessor 838 via a high-performance interface 892. In some embodiments, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor 870, 880 or outside of both processors, yet connected with the processors via P-P interconnect, such that either or both processors' local cache information may be stored in the shared cache if a processor is placed into a low power mode.

Chipset 890 may be coupled to a first interconnect 816 via an interface 896. In some embodiments, first interconnect 816 may be a Peripheral Component Interconnect (PCI) interconnect, or an interconnect such as a PCI Express interconnect or another I/O interconnect. In some embodiments, one of the interconnects couples to a power control unit (PCU) 817, which may include circuitry, software, and/or firmware to perform power management operations with regard to the processors 870, 880 and/or co-processor 838. PCU 817 provides control information to a voltage regulator to cause the voltage regulator to generate the appropriate regulated voltage. PCU 817 also provides control information to control the operating voltage generated. In various embodiments, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other embodiments, power management operations to be performed by PCU 817 may be implemented externally to a processor, such as by way of a separate power management integrated circuit (PMIC) or another component external to the processor. In yet other embodiments, power management operations to be performed by PCU 817 may be implemented within BIOS or other system software.

Various I/O devices 814 may be coupled to first interconnect 816, along with an interconnect (bus) bridge 818 which couples first interconnect 816 to a second interconnect 820. In some embodiments, one or more additional processor(s) 815, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 816. In some embodiments, second interconnect 820 may be a low pin count (LPC) interconnect. Various devices may be coupled to second interconnect 820 including, for example, a keyboard and/or mouse 822, communication devices 827 and a storage unit circuitry 828. Storage unit circuitry 828 may be a disk drive or other mass storage device which may include instructions/code and data 830, in some embodiments. Further, an audio I/O 824 may be coupled to second interconnect 820. Note that other architectures than the point-to-point architecture described above are possible. For example, instead of the point-to-point architecture, a system such as multiprocessor system 800 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 9:
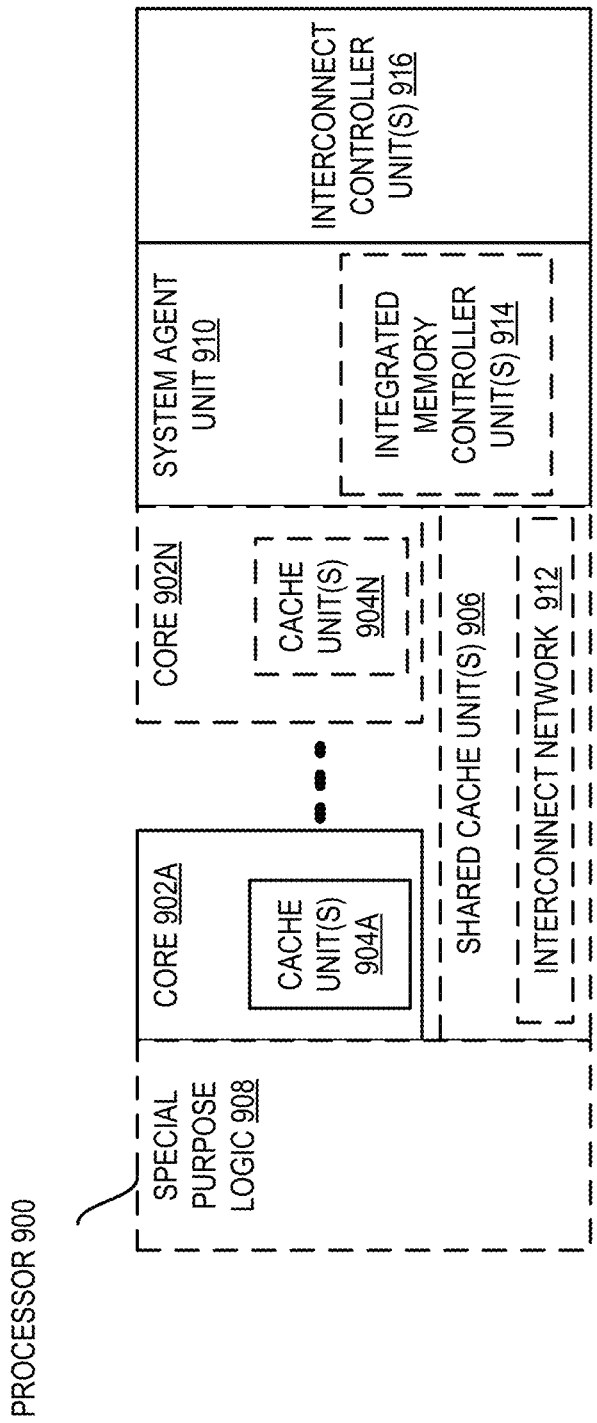
FIG. 9 illustrates a block diagram of embodiments of a processor that may have more than one core, may have an integrated memory controller, and may have integrated graphics.

FIG. 9 illustrates a block diagram of embodiments of a processor that may have more than one core, may have an integrated memory controller, and may have integrated graphics. The solid lined boxes illustrate a processor 900 with a single core 902A, a system agent 910, a set of one or more interconnect controller units circuitry 916, while the optional addition of the dashed lined boxes illustrates an alternative processor 900 with multiple cores 902(A)-(N), a set of one or more integrated memory controller unit(s) circuitry 914 in the system agent unit circuitry 910, and special purpose logic 908, as well as a set of one or more interconnect controller units circuitry 916. Note that the processor 900 may be one of the processors 870 or 880, or co-processor 838 or 815 of FIG. 8.

Thus, different implementations of the processor 900 may include: 1) a CPU with the special purpose logic 908 being integrated graphics and/or scientific (throughput) logic (which may include one or more cores, not shown), and the cores 902(A)-(N) being one or more general purpose cores (e.g., general purpose in-order cores, general purpose out-of-order cores, or a combination of the two); 2) a coprocessor with the cores 902(A)-(N) being a large number of special purpose cores intended primarily for graphics and/or scientific (throughput); and 3) a coprocessor with the cores 902(A)-(N) being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

A memory hierarchy includes one or more levels of cache unit(s) circuitry 904(A)-(N) within the cores 902(A)-(N), a set of one or more shared cache units circuitry 906, and external memory (not shown) coupled to the set of integrated memory controller units circuitry 914. The set of one or more shared cache units circuitry 906 may include one or more mid-level caches, such as level 2 (L2), level 3 (L3), level 4 (L4), or other levels of cache, such as a last level cache (LLC), and/or combinations thereof. While in some embodiments ring based interconnect network circuitry 912 interconnects the special purpose logic 908 (e.g., integrated graphics logic), the set of shared cache units circuitry 906, and the system agent unit circuitry 910, alternative embodiments use any number of well-known techniques for interconnecting such units. In some embodiments, coherency is maintained between one or more of the shared cache units circuitry 906 and cores 902(A)-(N).

In some embodiments, one or more of the cores 902(A)-(N) are capable of multi-threading. The system agent unit circuitry 910 includes those components coordinating and operating cores 902(A)-(N). The system agent unit circuitry 910 may include for example power control unit (PCU) circuitry and/or display unit circuitry (not shown). The PCU may be or may include logic and components needed for regulating the power state of the cores 902(A)-(N) and/or the special purpose logic 908 (e.g., integrated graphics logic). The display unit circuitry is for driving one or more externally connected displays.

The cores 902(A)-(N) may be homogenous or heterogeneous in terms of architecture instruction set; that is, two or more of the cores 902(A)-(N) may be capable of executing the same instruction set, while other cores may be capable of executing only a subset of that instruction set or a different instruction set.

Exemplary Core Architectures
In-Order and Out-of-Order Core Block Diagram

Figure 10A:
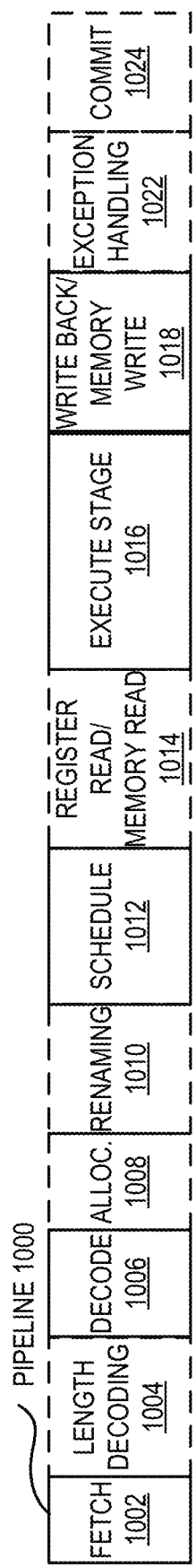
FIG. 10(A) is a block diagram illustrating both an exemplary in-order pipeline and an exemplary register renaming, out-of-order issue/execution pipeline according to embodiments of the invention.
Figure 10B:
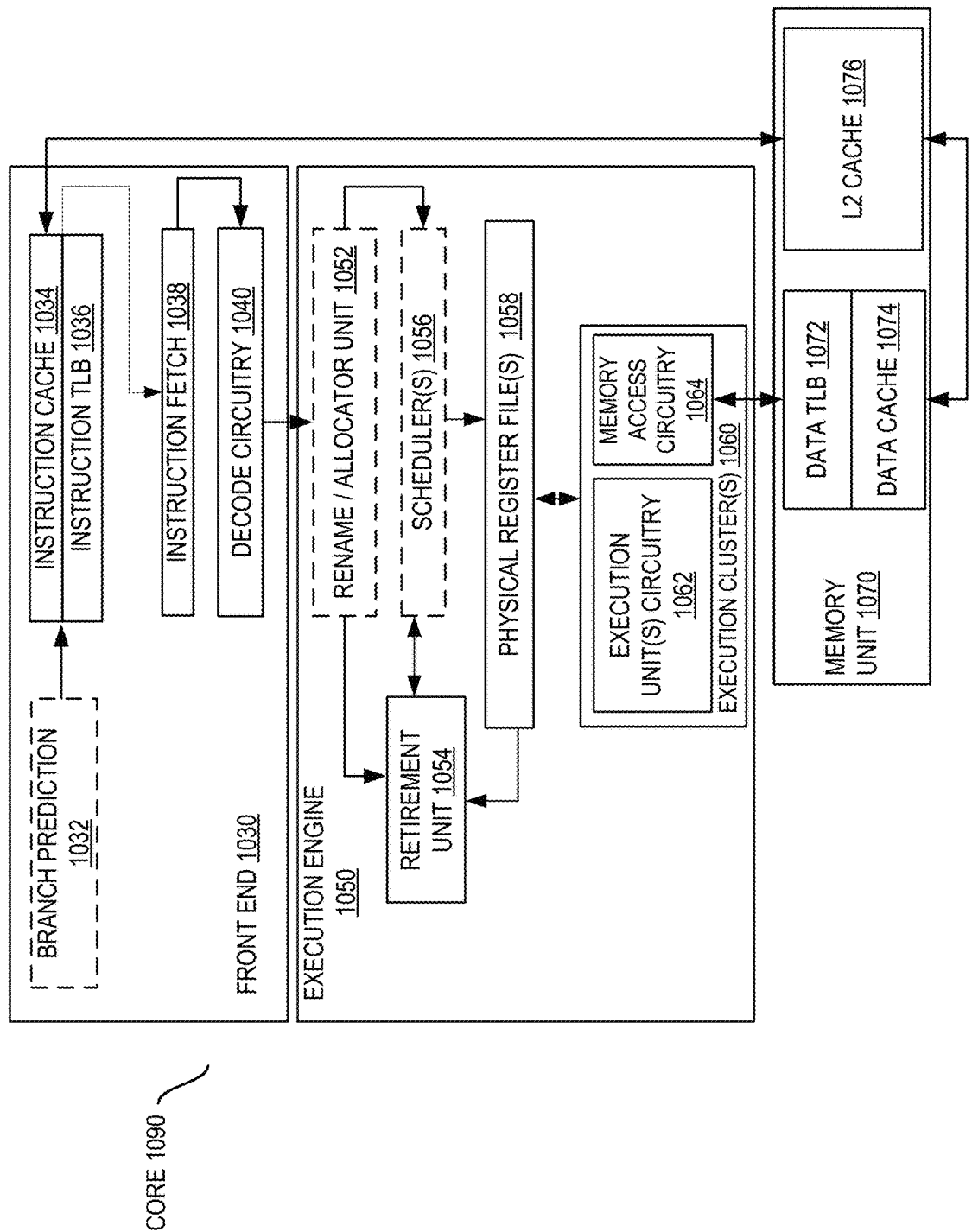
FIG. 10(B) is a block diagram illustrating both an exemplary embodiment of an in-order architecture core and an exemplary register renaming, out-of-order issue/execution architecture core to be included in a processor according to embodiments of the invention.

FIG. 10(A) is a block diagram illustrating both an exemplary in-order pipeline and an exemplary register renaming, out-of-order issue/execution pipeline according to embodiments of the invention. FIG. 10(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 10(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10(A), a processor pipeline 1000 includes a fetch stage 1002, an optional length decode stage 1004, a decode stage 1006, an optional allocation stage 1008, an optional renaming stage 1010, a scheduling (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, during the decode stage 1006, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 1006 and the register read/memory read stage 1014 may be combined into one pipeline stage. In one embodiment, during the execute stage 1016, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit circuitry 1040 performs the decode stage 1006; 3) the rename/allocator unit circuitry 1052 performs the allocation stage 1008 and renaming stage 1010; 4) the scheduler unit(s) circuitry 1056 performs the schedule stage 1012; 5) the physical register file(s) unit(s) circuitry 1058 and the memory unit circuitry 1070 perform the register read/memory read stage 1014; the execution cluster 1060 perform the execute stage 1016; 6) the memory unit circuitry 1070 and the physical register file(s) unit(s) circuitry 1058 perform the write back/memory write stage 1018; 7) various units (unit circuitry) may be involved in the exception handling stage 1022; and 8) the retirement unit circuitry 1054 and the physical register file(s) unit(s) circuitry 1058 perform the commit stage 1024.

FIG. 10(B) shows processor core 1090 including front-end unit circuitry 1030 coupled to an execution engine unit circuitry 1050, and both are coupled to a memory unit circuitry 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit circuitry 1030 may include branch prediction unit circuitry 1032 coupled to an instruction cache unit circuitry 1034, which is coupled to an instruction translation lookaside buffer (TLB) 1036, which is coupled to instruction fetch unit circuitry 1038, which is coupled to decode unit circuitry 1040. In one embodiment, the instruction cache unit circuitry 1034 is included in the memory unit circuitry 1070 rather than the front-end unit circuitry 1030. The decode unit circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1040 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM (not shown) or other medium that stores microcode for certain macroinstructions (e.g., in decode unit circuitry 1040 or otherwise within the front-end unit circuitry 1030). In one embodiment, the decode unit circuitry 1040 includes a micro-operation (micro-op) or operation cache (not shown) to hold/cache decoded operations, micro-tags, or micro-operations generated during the decode or other stages of the processor pipeline 1000. The decode unit circuitry 1040 may be coupled to rename/allocator unit circuitry 1052 in the execution engine unit circuitry 1050.

The execution engine circuitry 1050 includes the rename/allocator unit circuitry 1052 coupled to a retirement unit circuitry 1054 and a set of one or more scheduler(s) circuitry 1056. The scheduler(s) circuitry 1056 represents any number of different schedulers, including reservations stations, central instruction window, etc. In some embodiments, the scheduler(s) circuitry 1056 can include arithmetic logic unit (ALU) scheduler/scheduling circuitry, ALU queues, arithmetic generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit circuitry 1058 includes vector registers unit circuitry, writemask registers unit circuitry, and scalar register unit circuitry. These register units may provide architectural vector registers, vector mask registers, general-purpose registers, etc. The physical register file(s) unit(s) circuitry 1058 is overlapped by the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution units circuitry 1062 and a set of one or more memory access circuitry 1064. The execution units circuitry 1062 may perform various arithmetic, logic, floating point or other types of operations (e.g., shifts, addition, subtraction, multiplication) and on various types of data (e.g., scalar floating point, packed integer, packed floating point, vector integer, vector floating point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1056, physical register file(s) unit(s) circuitry 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1064). It should also be understood that where separate pipelines are used, one or more of these pipelines may be out-of-order issue/execution and the rest in-order.

In some embodiments, the execution engine unit circuitry 1050 may perform load store unit (LSU) address/data pipelining to an Advanced Microcontroller Bus (AHB) interface (not shown), and address phase and writeback, data phase load, store, and branches.

The set of memory access circuitry 1064 is coupled to the memory unit circuitry 1070, which includes data TLB unit circuitry 1072 coupled to a data cache circuitry 1074 coupled to a level 2 (L2) cache circuitry 1076. In one exemplary embodiment, the memory access units circuitry 1064 may include a load unit circuitry, a store address unit circuit, and a store data unit circuitry, each of which is coupled to the data TLB circuitry 1072 in the memory unit circuitry 1070. The instruction cache circuitry 1034 is further coupled to a level 2 (L2) cache unit circuitry 1076 in the memory unit circuitry 1070. In one embodiment, the instruction cache 1034 and the data cache 1074 are combined into a single instruction and data cache (not shown) in L2 cache unit circuitry 1076, a level 3 (L3) cache unit circuitry (not shown), and/or main memory. The L2 cache unit circuitry 1076 is coupled to one or more other levels of cache and eventually to a main memory.

The core 1090 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 1090 includes logic to support a packed data instruction set extension (e.g., AVX1, AVX2), thereby allowing the operations used by many multimedia applications to be performed using packed data.

Exemplary Execution Unit(s) Circuitry

Figure 11:
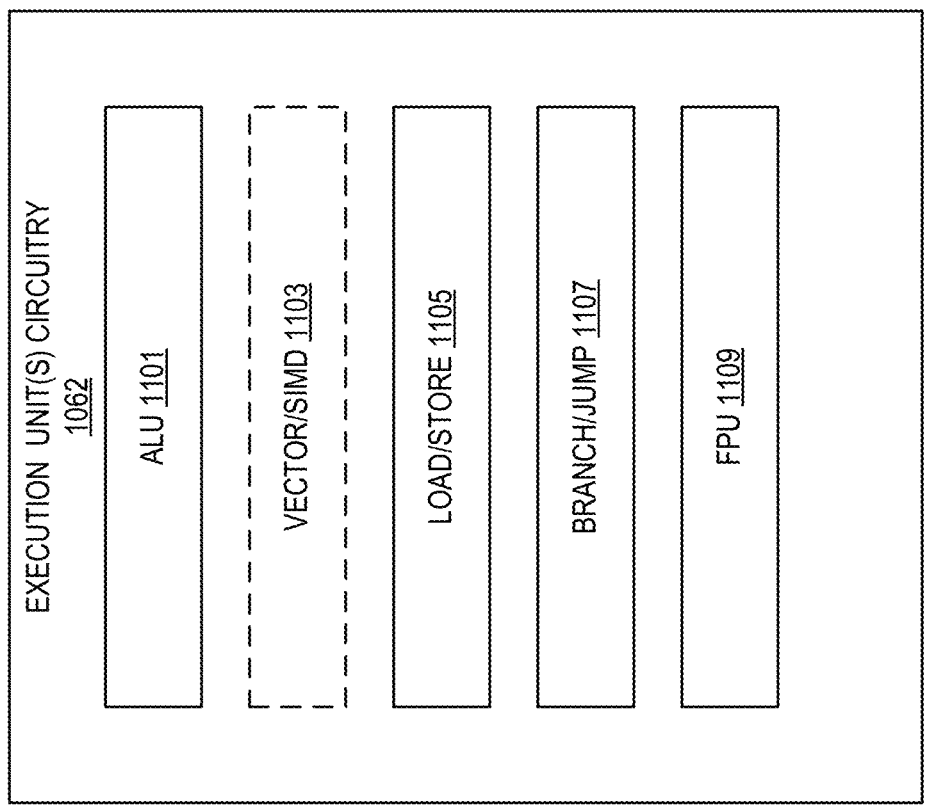
FIG. 11 illustrates embodiments of execution unit(s) circuitry.

FIG. 11 illustrates embodiments of execution unit(s) circuitry, such as execution unit(s) circuitry 1062 of FIG. 10(B). As illustrated, execution unit(s) circuitry 1062 may include one or more ALU circuits 1101, vector/SIMD unit circuits 1103, load/store unit circuits 1105, and/or branch/jump unit circuits 1107. ALU circuits 1101 perform integer arithmetic and/or Boolean operations. Vector/SIMD unit circuits 1103 perform vector/SIMD operations on packed data (such as SIMD/vector registers). Load/store unit circuits 1105 execute load and store instructions to load data from memory into registers or store from registers to memory. Load/store unit circuits 1105 may also generate addresses. Branch/jump unit circuits 1107 cause a branch or jump to a memory address depending on the instruction. FPU circuits 1109 perform floating-point arithmetic. The width of the execution unit(s) circuitry 1062 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 12:
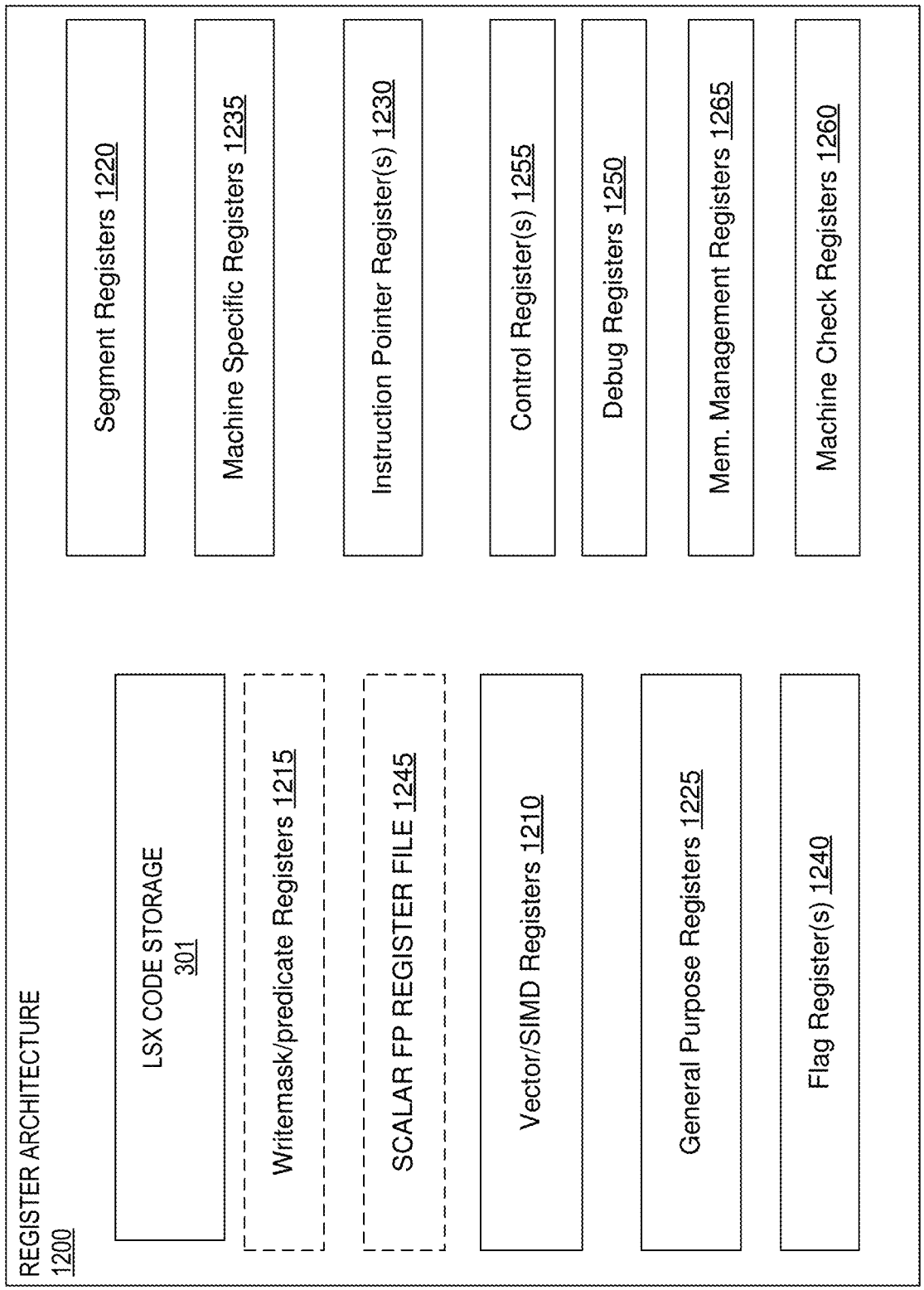
FIG. 12 is a block diagram of a register architecture according to some embodiments.

FIG. 12 is a block diagram of a register architecture 1200 according to some embodiments. As illustrated, there are vector/SIMD registers 1210 that vary from 128-bit to 1,024 bits width. In some embodiments, the vector/SIMD registers 1210 are physically 512-bits and, depending upon the mapping, only some of the lower bits are used. For example, in some embodiments, the vector/SIMD registers 1210 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1200 includes writemask/predicate registers 1215. For example, in some embodiments, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1215 corresponds to a data element position of the destination. In other embodiments, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1200 includes scalar floating point register 1245 which is used for scalar floating-point operations on 32/64/80-bit floating point data using the x87 instruction set extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some embodiments, the one or more flag registers 1240 are called program status and control registers.

Segment registers 1220 contain segment points for use in accessing memory. In some embodiments, these registers are referenced by the names CS, DS, SS, ES, FS, and GS.

Machine specific registers (MSRs) 1235 control and report on processor performance. Most MSRs 1235 handle system related functions and are not accessible to an application program. Machine check registers 1260 consist of control, status, and error reporting MSRs that are used to detect and report on hardware errors.

One or more instruction pointer register(s) 1230 store an instruction pointer value. Control register(s) 1255 (e.g., CR0-CR4) determine the operating mode of a processor (e.g., processor 870, 880, 838, 818, and/or 900) and the characteristics of a currently executing task. Debug registers 1250 control and allow for the monitoring of a processor or core's debugging operations.

Memory management registers 1265 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 13:
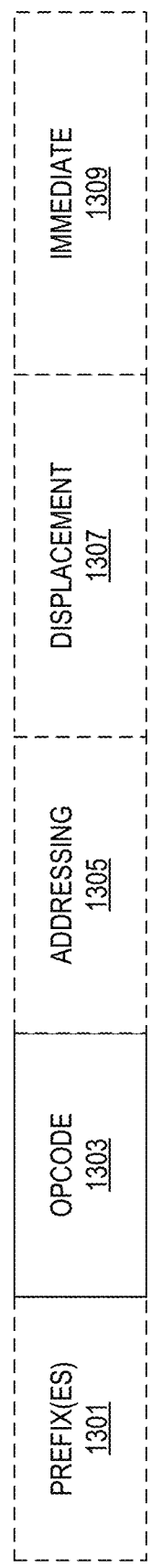
FIG. 13 illustrates embodiments of an instruction format.

FIG. 13 illustrates embodiments of an instruction format. As illustrated, an instruction may include multiple components including, but not limited to one or more fields for: one or more prefixes 1301, an opcode 1303, addressing information 1305 (e.g., register identifiers, memory addressing information, etc.), a displacement value 1307, and/or an immediate 1309. Note that some instructions utilize some or all of the fields of the format whereas others may only use the field for the opcode 1303. In some embodiments, the order illustrated is the order in which these fields are to be encoded, however, it should be appreciated that in other embodiments these fields may be encoded in a different order, combined, etc.

The prefix(es) field(s) 1301, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1303 is used to at least partially define the operation to be performed upon a decoding of the instruction. In some embodiments, a primary opcode encoded in the opcode field 1303 is 1, 2, or 3 bytes in length. In other embodiments, a primary opcode can be a different length. An additional 3-bit opcode field is sometimes encoded in another field.

Figure 14:
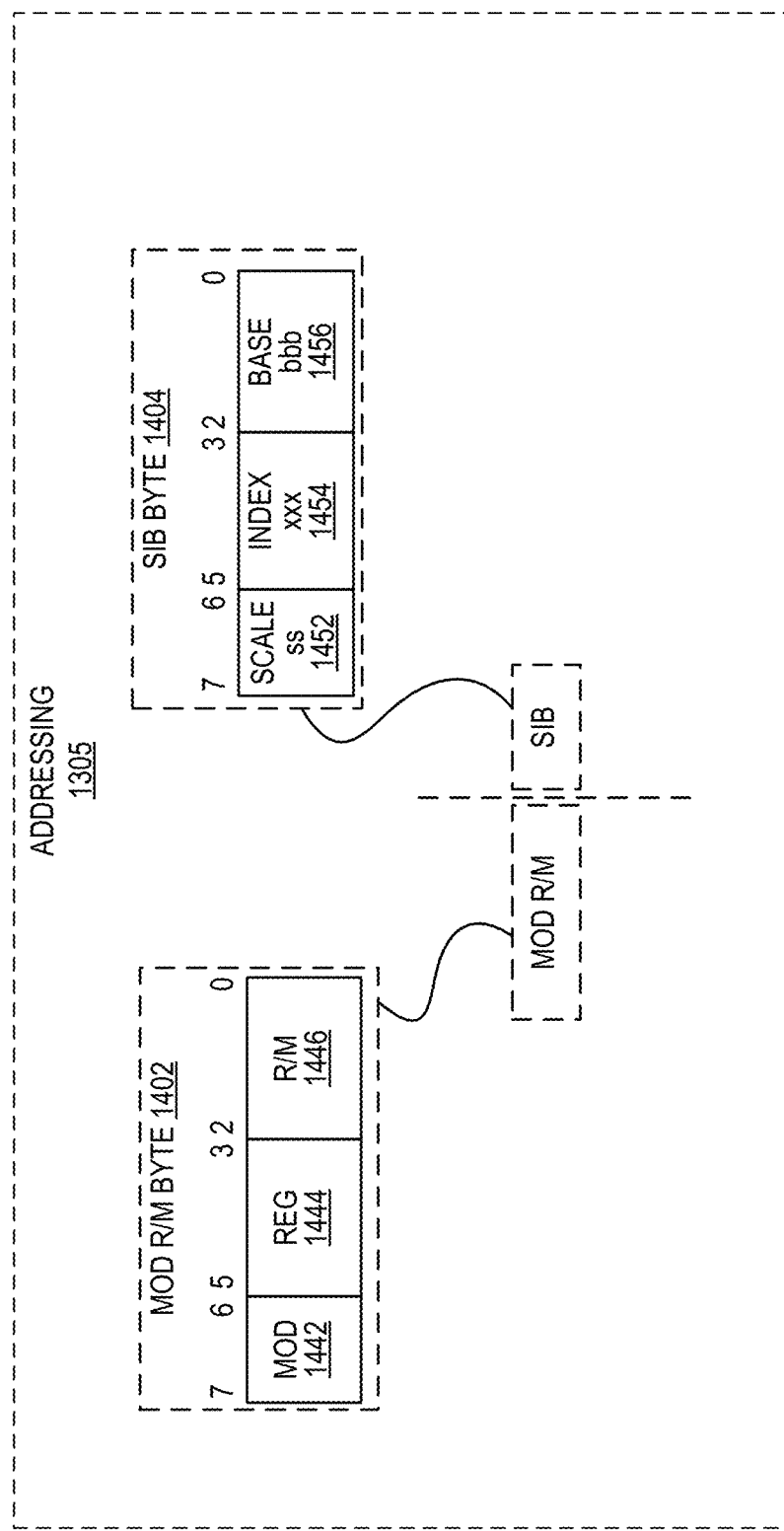
FIG. 14 illustrates embodiments of the addressing field.

The addressing field 1305 is used to address one or more operands of the instruction, such as a location in memory or one or more registers. FIG. 14 illustrates embodiments of the addressing field 1305. In this illustration, an optional ModR/M byte 1402 and an optional Scale, Index, Base (SIB) byte 1404 are shown. The ModR/M byte 1402 and the SIB byte 1404 are used to encode up to two operands of an instruction, each of which is a direct register or effective memory address. Note that each of these fields are optional in that not all instructions include one or more of these fields. The MOD R/M byte 1402 includes a MOD field 1442, a register field 1444, and R/M field 1446.

The content of the MOD field 1442 distinguishes between memory access and non-memory access modes. In some embodiments, when the MOD field 1442 has a value of b11, a register-direct addressing mode is utilized, and otherwise register-indirect addressing is used.

The register field 1444 may encode either the destination register operand or a source register operand, or may encode an opcode extension and not be used to encode any instruction operand. The content of register index field 1444, directly or through address generation, specifies the locations of a source or destination operand (either in a register or in memory). In some embodiments, the register field 1444 is supplemented with an additional bit from a prefix (e.g., prefix 1301) to allow for greater addressing.

The R/M field 1446 may be used to encode an instruction operand that references a memory address, or may be used to encode either the destination register operand or a source register operand. Note the R/M field 1446 may be combined with the MOD field 1442 to dictate an addressing mode in some embodiments.

The SIB byte 1404 includes a scale field 1452, an index field 1454, and a base field 1456 to be used in the generation of an address. The scale field 1452 indicates scaling factor. The index field 1454 specifies an index register to use. In some embodiments, the index field 1454 is supplemented with an additional bit from a prefix (e.g., prefix 1301) to allow for greater addressing. The base field 1456 specifies a base register to use. In some embodiments, the base field 1456 is supplemented with an additional bit from a prefix (e.g., prefix 1301) to allow for greater addressing. In practice, the content of the scale field 1452 allows for the scaling of the content of the index field 1454 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1307 provides this value. Additionally, in some embodiments, a displacement factor usage is encoded in the MOD field of the addressing field 1305 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1307.

In some embodiments, an immediate field 1309 specifies an immediate for the instruction. An immediate may be encoded as a 1-byte value, a 2-byte value, a 4-byte value, etc.

FIG. 15 illustrates embodiments of a first prefix 1301(A). In some embodiments, the first prefix 1301(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1301(A) may specify up to three registers using 3-bit fields depending on the format: 1) using the reg field 1444 and the R/M field 1446 of the Mod R/M byte 1402; 2) using the Mod R/M byte 1402 with the SIB byte 1404 including using the reg field 1444 and the base field 1456 and index field 1454; or 3) using the register field of an opcode.

In the first prefix 1301(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1444 and MOD R/M R/M field 1446 alone can each only address 8 registers.

In the first prefix 1301(A), bit position 2 (R) may an extension of the MOD R/M reg field 1444 and may be used to modify the ModR/M reg field 1444 when that field encodes a general purpose register, a 64-bit packed data register (e.g., a SSE register), or a control or debug register. R is ignored when Mod R/M byte 1402 specifies other registers or defines an extended opcode.

Bit position 1 (X) X bit may modify the SIB byte index field 1454.

Bit position B (B) B may modify the base in the Mod R/M R/M field 1446 or the SIB byte base field 1456; or it may modify the opcode register field used for accessing general purpose registers (e.g., general purpose registers 1225).

FIGS. 16(A)-(D) illustrate embodiments of how the R, X, and B fields of the first prefix 1301(A) are used. FIG. 16(A) illustrates R and B from the first prefix 1301(A) being used to extend the reg field 1444 and R/M field 1446 of the MOD R/M byte 1402 when the SIB byte 1404 is not used for memory addressing. FIG. 16(B) illustrates R and B from the first prefix 1301(A) being used to extend the reg field 1444 and R/M field 1446 of the MOD R/M byte 1402 when the SIB byte 1404 is not used (register-register addressing). FIG. 16(C) illustrates R, X, and B from the first prefix 1301(A) being used to extend the reg field 1444 of the MOD R/M byte 1402 and the index field 1454 and base field 1456 when the SIB byte 1404 being used for memory addressing. FIG. 16(D) illustrates B from the first prefix 1301(A) being used to extend the reg field 1444 of the MOD R/M byte 1402 when a register is encoded in the opcode 1303.

Figure 17A:
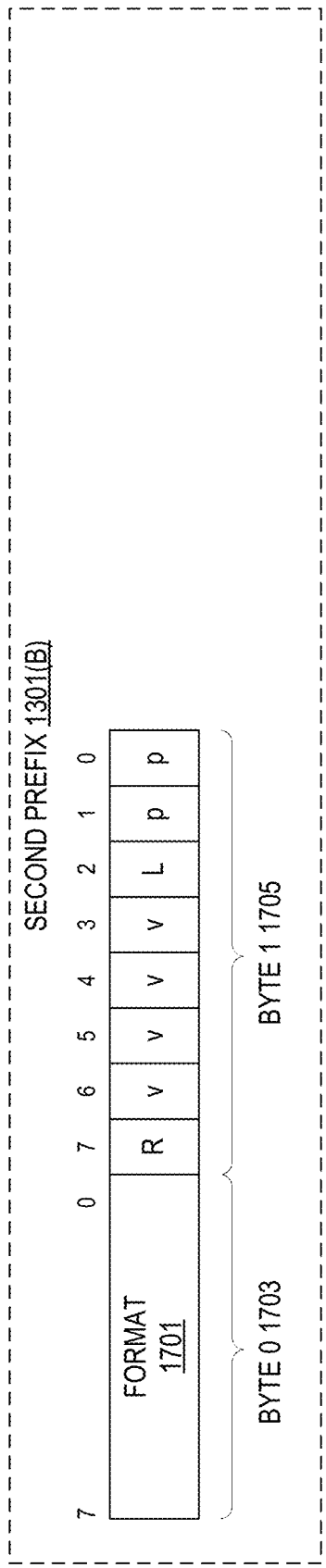
FIGS. 17(A)-(B) illustrate embodiments of a second prefix.
Figure 17B:
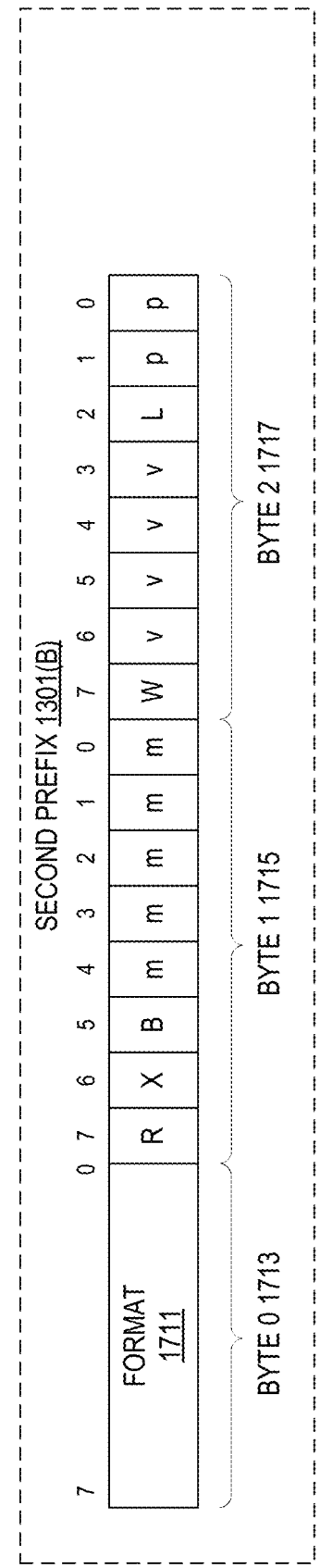

FIGS. 17(A)-(B) illustrate embodiments of a second prefix 1301(B). In some embodiments, the second prefix 1301(B) is an embodiment of a VEX prefix. The second prefix 1301(B) encoding allows instructions to have more than two operands, and allows SIMD vector registers (e.g., vector/SIMD registers 1210) to be longer than 64-bits (e.g., 128-bit and 256-bit). The use of the second prefix 1301(B) provides for three-operand (or more) syntax. For example, previous two-operand instructions performed operations such as A=A+B, which overwrites a source operand. The use of the second prefix 1301(B) enables operands to perform nondestructive operations such as A=B+C.

In some embodiments, the second prefix 1301(B) comes in two forms—a two-byte form and a three-byte form. The two-byte second prefix 1301(B) is used mainly for 128-bit, scalar, and some 256-bit instructions; while the three-byte second prefix 1301(B) provides a compact replacement of the first prefix 1301(A) and 3-byte opcode instructions.

FIG. 17(A) illustrates embodiments of a two-byte form of the second prefix 1301(B). In one example, a format field 1701 (byte 0 1703) contains the value C5H. In one example, byte 1 1705 includes a "R" value in bit[7]. This value is the complement of the same value of the first prefix 1301(A). Bit[2] is used to dictate the length (L) of the vector (where a value of 0 is a scalar or 128-bit vector and a value of 1 is a 256-bit vector). Bits[1:0] provide opcode extensibility equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1309 are then used to encode the third source register operand.

FIG. 17(B) illustrates embodiments of a three-byte form of the second prefix 1301(B). in one example, a format field 1711 (byte 0 1713) contains the value C4H. Byte 1 1715 includes in bits[7:5] "R," "X," and "B" which are the complements of the same values of the first prefix 1301(A). Bits[4:0] of byte 1 1715 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1717 is used similar to W of the first prefix 1301(A) including helping to determine promotable operand sizes. Bit[2] is used to dictate the length (L) of the vector (where a value of 0 is a scalar or 128-bit vector) and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1309 are then used to encode the third source register operand.

Figure 18:
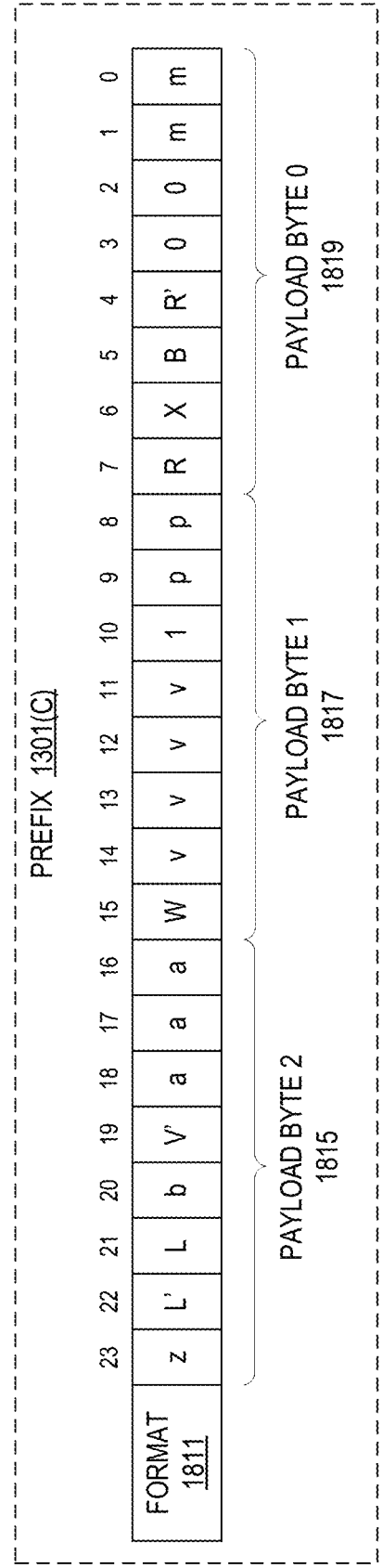
FIG. 18 illustrates embodiments of a third prefix.

FIG. 18 illustrates embodiments of a third prefix 1301(C). In some embodiments, the first prefix 1301(A) is an embodiment of an EVEX prefix. The third prefix 1301(C) is a four-byte prefix.

The third prefix 1301(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 12) or predication utilize this prefix. Opmask register allow for conditional processing or selection control. Opmask instructions, whose source/destination operands are opmask registers and treat the content of an opmask register as a single value, are encoded using the second prefix 1301(B).

The third prefix 1301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1301(C) is a format field 1811 that has a value, in one example, of 62H. Subsequent bytes are referred to as payload bytes 1815-1819 and collectively form a 24-bit value of P[23:0] providing specific capability in the form of one or more fields (detailed herein).

In some embodiments, P[1:0] of payload byte 1819 are identical to the low two mmmmm bits. P[3:2] are reserved in some embodiments. Bit P[4] (R') allows access to the high 16 vector register set when combined with P[7] and the ModR/M reg field 1444. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1444 and ModR/M R/M field 1446. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1301(A) and second prefix 1311(B) and may serve as an opcode extension bit or operand size promotion.

P[18:16] specify the index of a register in the opmask (writemask) registers (e.g., writemask/predicate registers 1215). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1301(C) are detailed in the following tables.

| 32-Register Support in 64-bit Mode | | | | | |
|---|---|---|---|---|---|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

| Encoding Register Specifiers in 32-bit Mode | | | |
|---|---|---|---|
| | [2:0] | REG. TYPE | COMMON USAGES |
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

| Opmask Register Specifier Encoding | | | |
|---|---|---|---|
| | [2:0] | REG. TYPE | COMMON USAGES |
| REG | ModR/M Reg | k0-k7 | Source |
| VVVV | vvvv | k0-k7 | 2nd Source |
| RM | ModR/M R/M | k0-7 | 1st Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
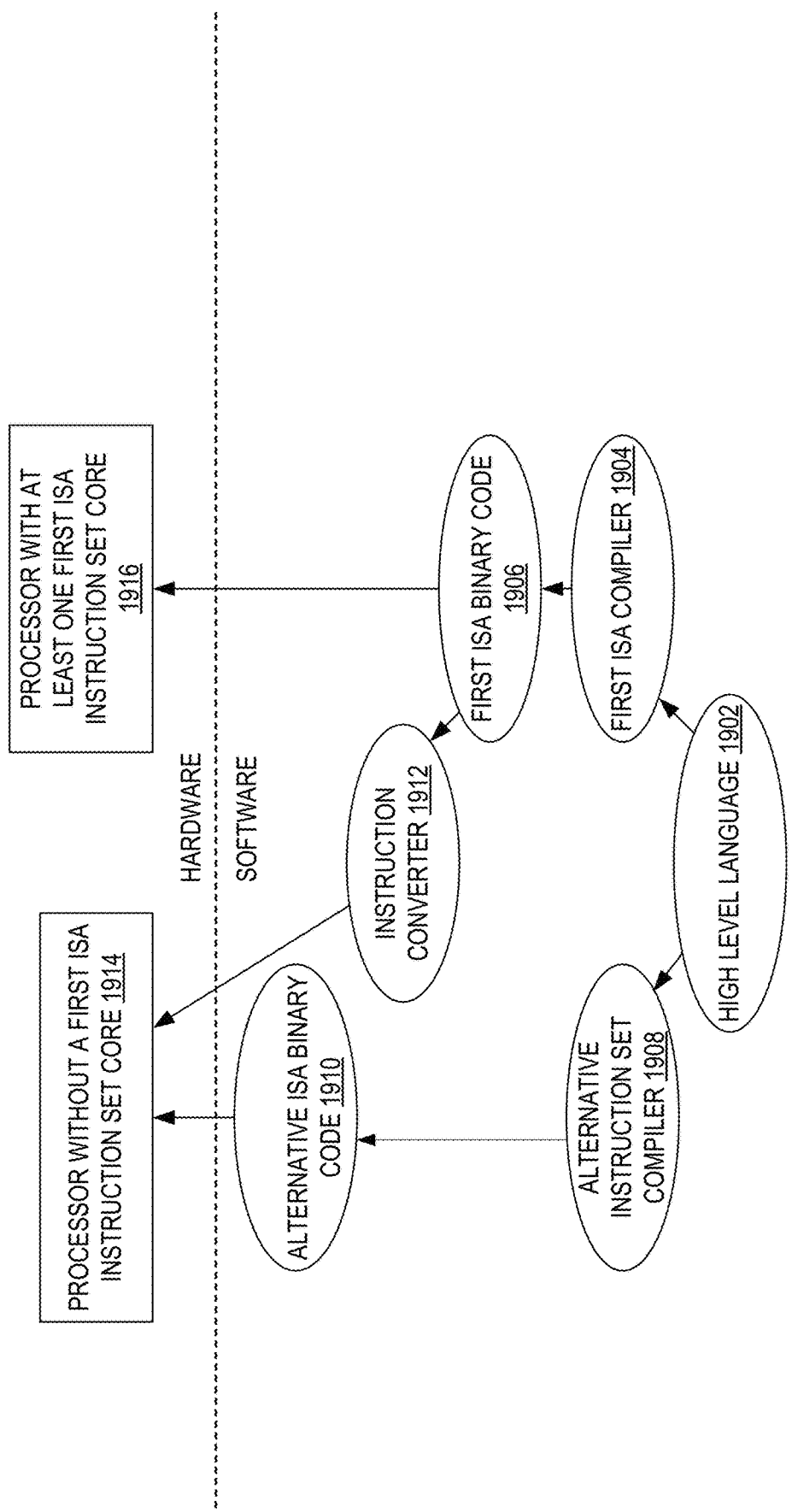
FIG. 19 illustrates a block diagram contrasting the use of a software instruction converter to convert binary instructions in a source instruction set to binary instructions in a target instruction set according to embodiments of the invention.

FIG. 19 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using a first ISA compiler 1904 to generate first ISA binary code 1906 that may be natively executed by a processor with at least one first instruction set core 1916. The processor with at least one first ISA instruction set core 1916 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1904 represents a compiler that is operable to generate first ISA binary code 1906 (e.g., object code) that can, with or without additional linkage processing, be executed on the processor with at least one first ISA instruction set core 1916. Similarly, FIG. 19 shows the program in the high level language 1902 may be compiled using an alternative instruction set compiler 1908 to generate alternative instruction set binary code 1910 that may be natively executed by a processor without a first ISA instruction set core 1914. The instruction converter 1912 is used to convert the first ISA binary code 1906 into code that may be natively executed by the processor without a first ISA instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have a first ISA instruction set processor or core to execute the first ISA binary code 1906.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Examples of embodiments include, but are not limited to:

Example 1. An apparatus comprising: decoder circuitry to decode a single instruction, the single instruction to include a field for an opcode, the opcode to indicate execution circuitry is to perform an operation to configure execution of one or more loops, wherein the one or more loops are to include a plurality of configuration instructions and instructions that are to use metadata generated by ones of the plurality of configuration instructions; and execution circuitry to perform the operation as indicated by the opcode.

Example 2. The apparatus of example 1, wherein the metadata generated is to include at least one of a loop count, a stride value, and a base address.

Example 3. The apparatus of any of examples 1-2, wherein the instructions that are to use metadata generated by ones of the plurality of configuration instructions are to be: placed into code storage after being decoded; unrolled and scheduled from the code storage using an unroll scheduler; and placed into one or more issue queues for execution.

Example 4. The apparatus of example 3, wherein the instructions that are to use metadata generated by ones of the plurality of configuration instructions are to be duplicated in the one or more issue queues such that there is an instance per loop iteration.

Example 5. The apparatus of example 3, wherein the code storage is a register file.

Example 6. The apparatus of any of examples 1-5, wherein the instructions that are to use metadata generated by ones of the plurality of configuration instructions are to utilize a bit in a prefix to identify them as instructions that are to use metadata generated by ones of the plurality of configuration instructions.

Example 7. The apparatus of any of examples 1-5, wherein the instructions that are to use metadata generated by ones of the plurality of configuration instructions are to be tagged by the decoder to identify them as instructions that are to use metadata generated by ones of the plurality of configuration instructions.

Example 8. The apparatus of any of examples 1-5, wherein the instructions that are to use metadata generated by ones of the plurality of configuration instructions are to be identified by the decoder by an opcode.

Example 9. A non-transitory machine-readable medium storing at least one instruction which when processed by a processor is to cause the processor to perform a method comprising: decoding a single instruction, the single instruction to include a field for an opcode, the opcode to indicate execution circuitry is to perform an operation to configure execution of one or more loops, wherein the one or more loops are to include a plurality of configuration instructions and instructions that are to use metadata generated by ones of the plurality of configuration instructions; and executing the decoded instruction to perform operation as indicated by the opcode.

Example 10. The non-transitory machine-readable medium of example 9, wherein the metadata generated is to include at least one of a loop count, a stride value, and a base address.

Example 11. The non-transitory machine-readable medium of any of examples 9-10, wherein the instructions that are to use metadata generated by ones of the plurality of configuration instructions are to be: placed into code storage after being decoded; unrolled and scheduled from the code storage using an unroll scheduler; and placed into one or more issue queues for execution.

Example 12. The non-transitory machine-readable medium of example 11, wherein the instructions that are to use metadata generated by ones of the plurality of configuration instructions are to be duplicated in the one or more issue queues such that there is an instance per loop iteration.

Example 13. The non-transitory machine-readable medium of example 11, wherein the code storage is a register file.

Example 14. The non-transitory machine-readable medium of any of examples 9-13, wherein the instructions that are to use metadata generated by ones of the plurality of configuration instructions are to utilize a bit in a prefix to identify them as instructions that are to use metadata generated by ones of the plurality of configuration instructions.

Example 15. The non-transitory machine-readable medium of any of examples 9-13, wherein the instructions that are to use metadata generated by ones of the plurality of configuration instructions are to be tagged by the decoder to identify them as instructions that are to use metadata generated by ones of the plurality of configuration instructions.

Example 16. The non-transitory machine-readable medium of any of examples 9-13, wherein the instructions that are to use metadata generated by ones of the plurality of configuration instructions are to be identified by the decoder by an opcode.

Example 17. A system apparatus comprising: memory to store instructions; a processor coupled to the memory, the processor comprising: decoder circuitry to decode a single instruction of the stored instructions, the single instruction to include a field for an opcode, the opcode to indicate execution circuitry is to perform an operation to configure execution of one or more loops, wherein the one or more loops are to include a plurality of configuration instructions and instructions that are to use metadata generated by ones of the plurality of configuration instructions; and execution circuitry to perform the operation as indicated by the opcode.

Example 18. The system of example 17, wherein the metadata generated is to include at least one of a loop count, a stride value, and a base address.

Example 19. The system of any of examples 17-18, wherein the instructions that are to use metadata generated by ones of the plurality of configuration instructions are to be: placed into code storage after being decoded; unrolled and scheduled from the code storage using an unroll scheduler; and placed into one or more issue queues for execution.

Example 20. The apparatus of example 19, wherein the code storage is a register file.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Method and Apparatus for Leveraging Simultaneous Multithreading for Bulk Compute In recent years, the concept of near-memory or in-memory compute has been widely discussed and evaluated, due to its potential performance and power benefits. However, prior near and in-memory proposals attempt to leverage only a single memory in the CPU/GPU memory hierarchy (typically the last level of cache or the DRAM/HBM-based main memory). Additionally, existing proposals cannot work within the CPU memory model (including Total Store Order (TSO)) and require complex/costly changes for coherence and unconventional programming models, often with explicit software control that require new hooks as well as heavy dependence on the programmer. All of these requirements limit the practical ability to implement and optimally exploit near and in-memory compute.

Existing solutions include Remote Atomic Operations (RAO) which specifically tackle the problem of atomic operation execution. In multicore processors, when multiple processors are contending for the variable being accessed atomically, there is significant ping-ponging of the cacheline holding the variable across private caches of cores through the shared interconnect. This increases interconnect traffic, resulting in bandwidth pressure and reduced performance. RAO adds extensions to these atomic instructions and allows for their remote execution in the last level of cache (which is where coherence is tracked).

RAO tackles a very specific problem of atomic instructions by executing them only at the last level of cache (LLC). RAO does support TSO by dispatching these atomic instructions to the near LLC compute only when they are at the head of the ROB (next to retire). However, this is only applicable for atomic instructions (one instruction at a time) and only at the LLC.

PIM Enabled Instruction (PEI) provides instruction set extensions that enable computation in main memory by allowing either the host or the memory to execute instructions that carry a PEI marker. PEI Computation Units (PCUs) are placed in the core and near the DRAM units. Offloading of PEIs to the memory-side PCUs are on an instruction-by-instruction basis and uses translation of PEI instructions to appropriate memory commands.

PEI is primarily intended for an offload near main memory (DRAM/HBM). While it can be extended with additional information to further select some other level in the memory hierarchy for execution, it still requires explicit programmer input and is done on a per-instruction basis. Each instruction would have to specify the single hierarchy level to execute at. Furthermore, PEI requires extensive additions to support coherence and virtual memory and new hardware to dynamically determine if it is better to ignore the PEI marker for certain instructions. Finally PEI has no support for the x86 CPU memory consistency model (TSO).

Livia proposes a memory-services model which captures applications as graphs of tasks and dependences between the tasks. Memory Service Elements (MSEs) are computational units that are distributed near caches. The tasks are "lowered" to the cache level where the data resides and are executed on the MSE attached to that level, potentially reducing data marshalling. While enabling compute near caches, Livia breaks existing programming models by having the programs to be rewritten as computational graphs and their dependences. Livia is designed for single threaded programs. Only one MSE could be active at a time. Further, Livia is designed only for irregular data accesses, and offloading is possible only on a per instruction basis.

In-cache solutions like Compute Cache and Neural Cache enable bit-serial and bit-parallel computation by changing the subarray structures of caches (primarily LLC) enabling bulk arithmetic. However, Compute Cache and Neural Cache proposals change the density of highly optimized CPU caches (primarily LLC) because of the embedding of computation units. They also have no supporting programming models and require careful data alignment across subarrays for the bulk arithmetic operations.

Significantly, none of the existing near and in memory proposals can simultaneously support optimal usage of multiple memories in the memory hierarchy while obeying the CPU memory consistency model with simple, low cost support for hardware coherence and while also working within the existing CPU programming model.

Embodiments of the invention target bulk near-cache compute for kernels used by workloads like Deep Neural Networks (a key workload with near ubiquitous usage) that are heavily data parallel (and hence whose performance is heavily dependent on the bandwidth provided), and include structured, repetitive loops with a large number of iterations.

This allows for a bulk offload of a large number of loop iterations (which comprises nearly all of the work in the kernel) to a near-cache unit by a thread. This bulk offload enables support for hardware Total Store Order (TSO) memory ordering within instructions of the thread without any significant performance impact. The near-cache unit maintains ordering for the instructions it executes. With a bulk offload, nearly all instructions in the kernel are within these loops, the CPU strictly orders multiple invocations to the near-cache unit without any significant performance impact. These embodiments leverage the Loop Support Extensions described above to succinctly encode multiple loops of instructions for a bulk offload of work to a near cache unit (NCU), sometimes referred to simply as a compute unit (CU).

In addition, embodiments of the invention leverage simultaneous multi-threading (SMT) to further enable near-cache compute operations near ALL the on-die caches in the CPU (e.g., L1, L2 and L3) while simultaneously supporting TSO. In some implementations, near cache compute units (NCUs) are placed near every on-die cache in the CPU (L1, L2 and L3) but each NCU is tied to a specific SMT thread (i.e., work can be dispatched to it only from that thread). This allows usage of ALL (or whatever subset is optimal) caches for near-cache compute by simply enabling the required SMT threads (for example: KMP_THREAD_AFFINITY with OpenMP). TSO is maintained within a thread (enabled via bulk offload of work) and no ordering is required across threads.

These embodiments are particularly applicable towards improving performance and power for key kernels such as those used in Deep Neural Networks and harnessing the potential of near-cache compute while simultaneously making it practical to implement. Specifically, these embodiments make innovative use of SMT in CPU cores and tie near cache compute units (NCUs) near all on die caches to specific SMT threads. This maximizes the usage of all existing cache bandwidth in the system with associated near cache compute. Furthermore, using SMT allows selection of the optimal set of NCUs by simply running the kernel on the appropriate threads. For example, certain kernels (typically matrix-vector operations) have low ops/byte and hence operate better with larger caches. These can be run only on SMT threads associated with near cache units at L2 and L3 (the large caches).

By combining SMT and bulk offload of work, the x86 CPU memory consistency model is supported. Some embodiments include additional micro-architectural components to support coherence and virtual memory requirements in the CPU.

Embodiments of the invention are described below using convolution kernels, widely used in DNN inference, as the backdrop. Current convolution kernels in oneDNN resemble the code shown in FIG. 20. These kernels have an outer loop 2001 which is parallelized, with each iteration of the outer loop 2001 writing to a distinct output tensor location. Within each iteration of the outermost loop 2001, the work 2002 is heavily data parallel. The outermost loop 2001 is divided across the number of threads and no data dependences exist across the threads. The output tensors are partitioned across threads and input and weight tensors are shared read-only data. Code within each thread is typically generated using a JIT engine and optimized for the target hardware.

In the traditional multicore execution of this type of kernel, chunks of outer loop 2001 would be assigned to different cores using a scheduling policy that is determined by the runtime environment. In the descriptions that follow, OpenMP is used for multi-threading, although the underlying principles of the invention are not limited to any particular specification or standard.

Figure 21:
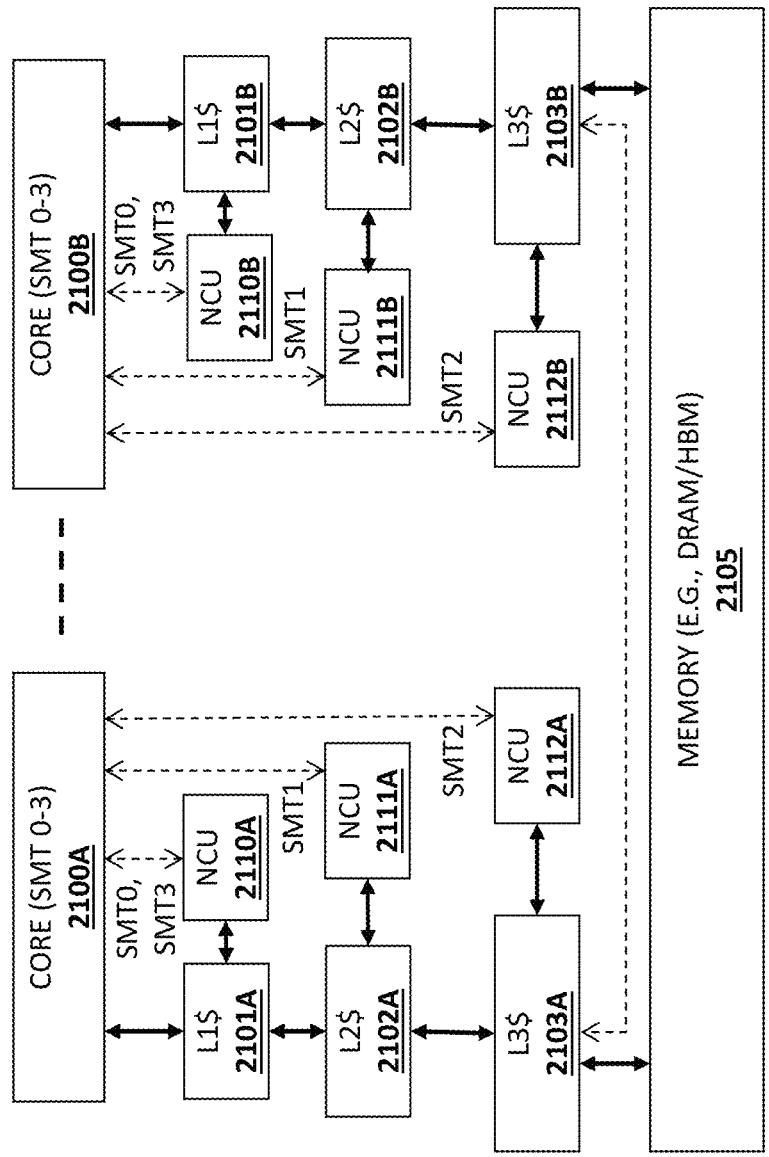
FIG. 21 illustrates an arrangement of near cache units (NCUs) associated with particular cache levels.

Referring to FIG. 21, in some embodiments, within each core 2100A-B, near-cache units (NCUs) 2110A-B and 2111A-B are configured near the L1 cache 2101A-B and L2 cache 2102A-B, respectively. Additional NCUs 2112A-B are configured near each L3/LLC slice 2103A-B. In various embodiments, the NCUs 2110A-B, 2111A-B, and 2112A-B include arithmetic units, load/store units, an address generation unit (AGU) and a set of registers (described below with respect to FIG. 24). One particular type of NCU is the Tensor Functional Unit hardware described above with respect to FIG. 3.

Each NCU 2110A-B, 2111A-B, 2112A-B sources data from the cache level or slice with which it is associated and writes results back to the same cache level/slice. If data is not found in the cache level to which the NCU is attached, the outer levels are looked up. In some embodiments, an NCU does not lookup and access data from a cache level that is relatively inner to its own cache level (for example NCU 2111A associated with L2 2102A cannot perform a lookup in the L1 cache 2101A.

Figure 22:
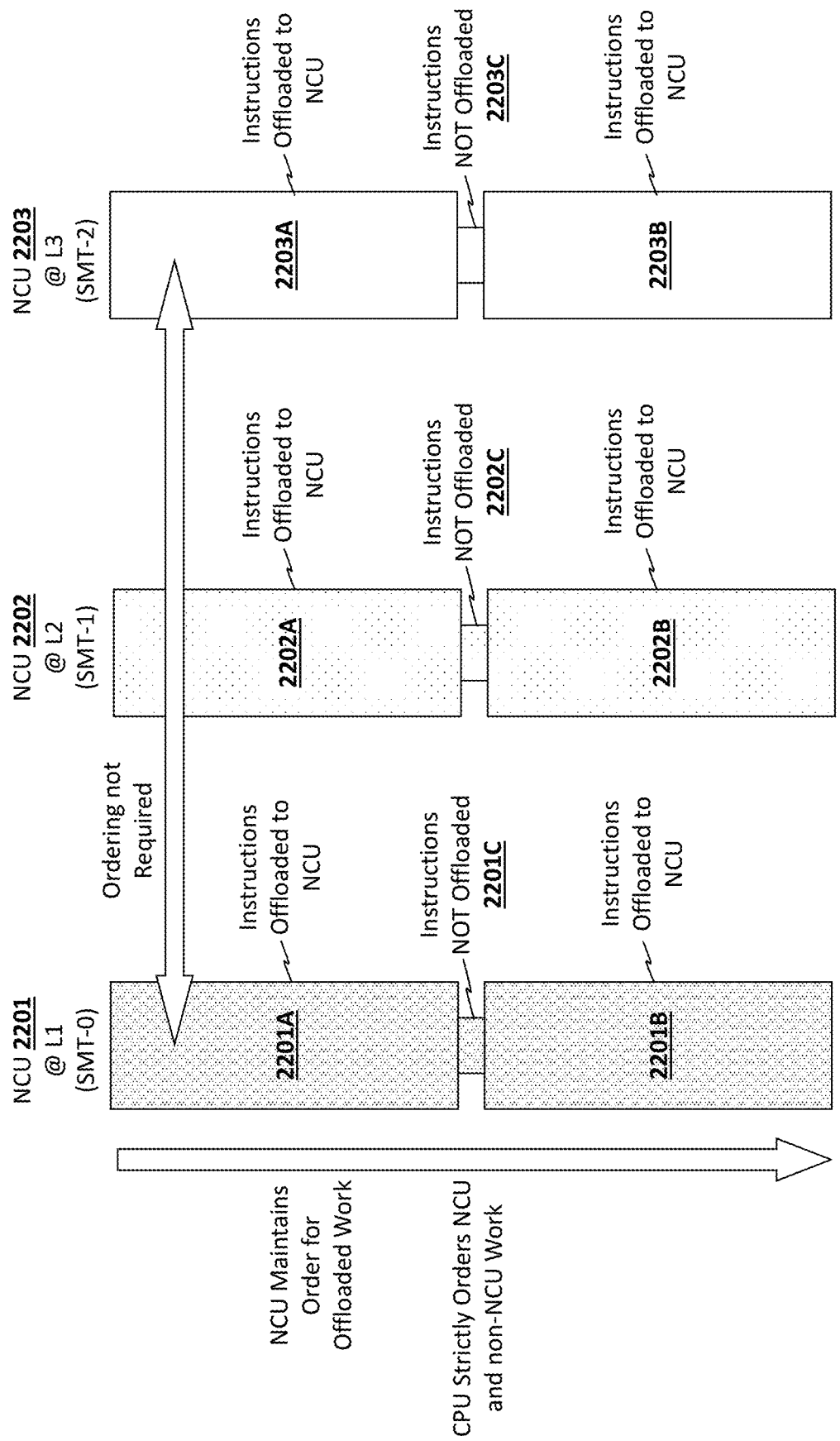
FIG. 22 illustrates how ordering is not required between NCUs associated with different cache levels because of SMT assignments.

FIG. 22 illustrates support for the TSO memory consistency model in various embodiments. As indicated by the horizontal double-sided arrow, ordering is not required between the L1 NCU 2201, the L2 NCU 2202, and the L3 NCU because each NCU is on a separate SMT thread. Within one thread, the L1 NCU 2201 maintains order for offloaded instructions 2201A-B while the CPU executes a small subset of instructions 2201C and maintains strict ordering for NCU and non-NCU work. Similarly, within another thread, the L2 NCU 2202 maintains order for offloaded instructions 2202A-B while the CPU executes instructions 2202C and maintains strict ordering for NCU and non-NCU work. Finally, in a third thread, the L3 NCU 2203 maintains order for the offloaded instructions 2203A-B, the CPU executes a small set of instructions 2203C and maintains strict ordering for NCU and non-NCU work.

Since a bulk offload is performed with a large number of iterations, only a small subset of the kernel is executed in the core (instructions 2201C, 2202C, 2203C). Strict ordering of dispatch between NCU and non-NCU work is therefore maintained without any measurable loss in performance.

Thus, embodiments of the invention leverage the SMT support available in CPUs to dispatch work to the near-cache NCUs by binding each NCU exclusively to one of the logical SMT threads in the physical core. Each NCU is part of a fully capable, OS-visible hardware context. In certain embodiments, for a three-level cache hierarchy attached to a core (i.e., having L1, L2, and L3 caches), SMT 0/SMT 3 are mapped to run on the NCU@L1 2201, SMT1 is mapped to run on NCU@L2 2202 and SMT2 is mapped to run on the NCU 2203 near the LLC slice of the core. This mapping may be repeated across multiple cores, enabling an n-core system to have 4n hardware contexts. The DNN frameworks can then distribute work across a chosen subset of cores and chosen NCUs within those cores.

In addition, in certain embodiments, the Loop Support ISA Extensions (LSX) described above are leveraged to perform bulk-offload. LSX allows concise encoding of repetitive loops. All the scalar operations required for address calculations are done once in the core in the corresponding thread and a self-contained LSX packet of instructions is dispatched to the NCU unit.

To enable bulk offload of work to the near-cache NCUs, the JIT framework may be augmented to generate LSX code for the inner loop body, retaining the parallel for in the outermost loop. The executable runs on the master thread in the main core. For each thread, the main core fills up the LSX instruction packet and then offloads it to NCUs based on the affinities.

Figure 23:
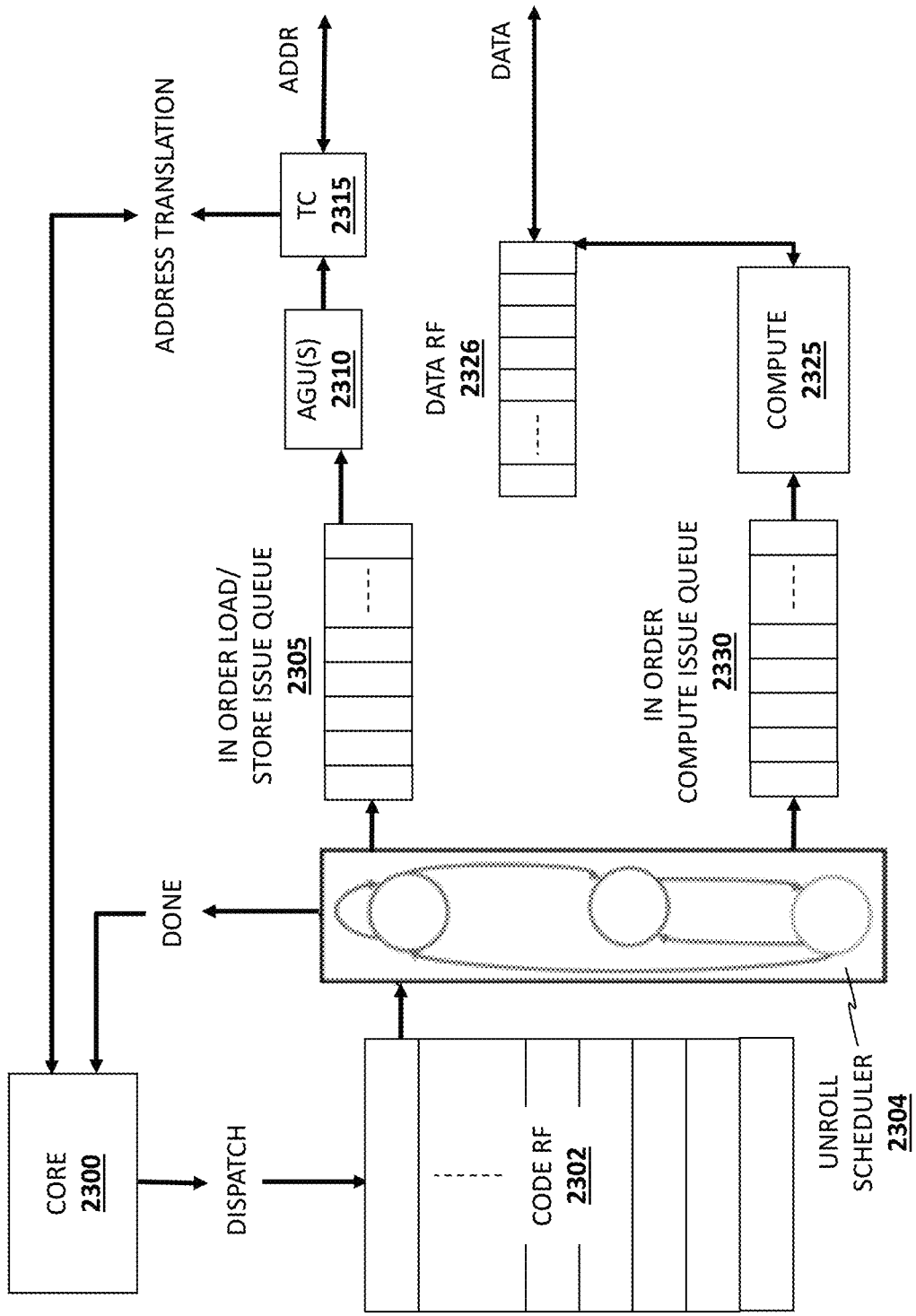
FIG. 23 illustrates an example architecture of a near cache unit (NCU).

FIG. 23 illustrates a microarchitecture of a near-cache unit (NCU) in accordance with various embodiments of the invention. The LSX code dispatched from the core 2300 is stored in the code RF register file 2302. The instructions are unrolled by an unroll scheduler 2304 into two in-order queues: a load/store queue 2305 that handles only load and store instructions in code RF 2302 and a compute issue queue 2330 that handles computation. This allows the loads and stores to jump over the compute operations while maintaining relative order within the load/store queue 2305.

Each load/store operation is processed by an Address Generation Unit (AGU) 2310 that computes the virtual address required for the computation. The full linear address is looked up in a translation cache (TC) 2315 for virtual to physical address translation. If the lookup in the TC 2315 is a hit, the address is sent out for cache lookup. If it is a miss, the TC sends out a request to the core's TLB for a copy of the translation. The NCU then uses the address to perform a lookup in the adjoining cache. A miss in the cache triggers a sequence of operations for handling cache misses.

Compute circuitry 2325 is fed from the in-order compute issue queue 2330. Entries in a data register file (RF) 2326 are used as sources and destinations for the compute operations executed by the compute circuitry 2325 and for reads/writes to cache.

The scheduler 2304 in the NCU generates a sequence of load/store and compute operations that are fed into the respective queues 2305, 2330. When the loop exit conditions are met, the work in the NCU is done and the NCU generates a DONE signal to the main core 2300. Control is then transferred to the main core 2300.

Embodiments of the invention include hardware support so that the above execution flows operate transparently to programmers. With respect to loads and stores, for example, the NCU AGUs 2310 compute the virtual addresses for loads and stores while caches in modern CPUs are physically tagged, necessitating address translation. Consequently, a small translation cache (TC) 2315 is configured to store recently observed virtual-to-physical address mappings seen by the NCU to reduce traffic to the TLBs of the core 2300. Misses to the TC 2315 can go through the existing TLBs and page-walkers of the local physical core 2300 for translations. In some implementations, any TLB invalidation or page swap invalidates all entries in the TC 2315 to ensure that the entries are fully coherent with the core's TLB.

OneDNN optimizations can use structured and special layouts, customized to feed the compute circuitry 2325 with a high spatial locality of tensor accesses. Through extensive characterization across various DNN application primitives and models, it has been determined that a TC 2315 can have as few as 6 entries and achieve a 95% hit-rate. The TLB of the core 2300 can see a hit-rate of 99%.

In addition, embodiments of the invention include support for distributed L3 caches. In modern CPUs, L3 caches are multi-bank structures shared across multiple cores. Any cache-block aligned address can reside in only one L3 bank, presenting a challenge for compute circuitry 2325 of NCUs placed near each L3 bank. When multiple near-L3 NCUs need to access the same address, and depending on the reuse out of the data RF 2326.

addresses may need to be loaded multiple times. Traversing the L3 interconnect for every address not available locally would cripple near-L3 NCU performance and add significant extra data movement overhead.

In some implementations, existing technologies such as Cache Allocation Technology (CAT) are leveraged to partition a portion of the set-associative L3 cache in each L3 bank as a local cache for the attached NCU, allowing shared cachelines (with added coherency support as described below). This may be accomplished, for example, by allocating a small subset of the total ways of the L3 cache to the attached NCU. Loads from these "local" partitions do not pay the mesh cost for accessing data. For DNN convolution primitives, multiple threads mapped to near-L3 NCUs across different slices can partition the output tensor space across the slices.

Because the weight tensors need to be shared across the slices, embodiments of the invention provide read-only sharing of the weight tensors across the near-L3 NCUs by replicating the weight tensors in each reserved L3 partition, thus minimizing mesh traffic in the LLC.

Figure 24:
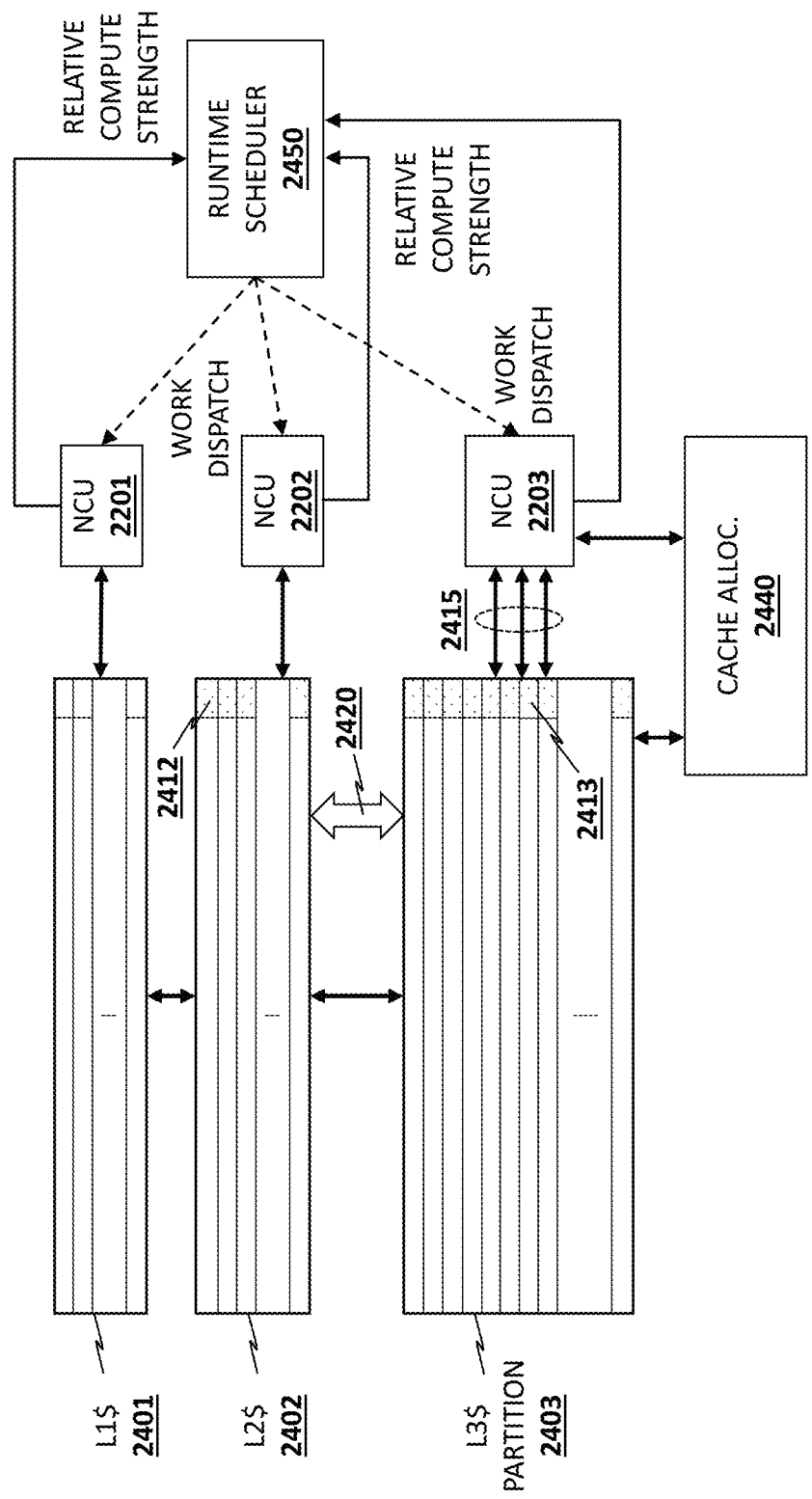
FIG. 24 illustrates features of various embodiments including a runtime scheduler which dispatches work to NCUs based on the relative compute strength of each NCU.

Since all NCUs are capable of executing threads, a small additional tracking structure is implemented in some embodiments to maintain overall cache coherence. In particular, as illustrated in FIG. 24, the L2 caches 2402 include an extra bit 2412 per cache-line to denote whether the L1 cache 2401 currently owns the cacheline. It uses this bit to ensure that it has ownership of the cache line before performing a store.

Similarly, the directory entries at the L3 cache partitions 2403 include an extra bit 2413 per near-L3 NCU 2203 in their "sharer/owner" vector structures. This denotes whether the partitioned local scratch-pad ways in that L3 bank 2403 own the cacheline. In some embodiments, additional snoop paths 2420 at the L2 cache and L3 cache are included on top of the baseline CPU cache coherence.

In some embodiments, strict load/store ordering within an NCU 2201-2203 is maintained (TSO). Within any thread, non-NCU operations past any NCU bulk-offload are not allocated until the NCU bulk-offload operations are complete. Non-NCU load/store ordering continues to be maintained by the core. Since each NCU 2201-2203 is allocated to a different SMT thread, ordering in the execution of loads and stores across NCUs does not need to be guaranteed.

In some implementations, the NCUs 2201-2203 generate exceptions like existing functional/compute units in the physical cores 2100A-B. To support context switches on a thread, the cores 2100A-B save and restore the NCU code registers 2302 and NCU data registers 2326 for all active threads as well as invalidate the local translation cache 2315. When performing DNN inference operations, context switches are extremely rare as inference is usually run as a micro-service. DNN primitives have an optimal set of NCUs for power/performance efficiency. For example, convolution primitives have high reuse of inputs and can benefit from executing on all cache levels. However, for fully-connected layer primitives, input reuse is low and execution in all cache levels is not useful; data movement across cache levels would be unnecessary, and execution would be more efficient only at the outermost levels of cache.

To support a subset of NCUs on which a primitive is to be executed, embodiments of the invention leverage SMT, binding an NCU to a logical thread, and using existing OpenMP APIs to set the affinity of a primitive to a subset of cores. Specifically, one implementation uses KMP SET AFFINITY in the LLVM OpenMP Runtime to achieve this. DNN frameworks (TensorFlow, Caffe etc.) may do the same before invoking oneDNN primitives.

Since caches across the multi-level hierarchy have different bandwidths, their corresponding NCU will have different compute "widths" as well to optimally utilize the available cache bandwidth at that level. For compute bound primitives like convolution, work is distributed across NCUs in proportion with their compute strength for optimal performance. With high cache hit-rates and predictable performance, such a "static" division of work is sufficient for these workloads. Towards this end, a new type of scheduling, referred to as static asymmetric scheduling is used in the LLVM OpenMP runtime that partitions work proportionally to the compute strengths of the NCUs.

For example, if three NCUs with compute strengths in a 2:2:1 ratio are placed in three cache levels, static equal division of work (1:1:1) would result in unequal thread completion times with the third (weakest) NCU determining final runtime. With static asymmetric work distribution, the workloads are also assigned in the ratio of 2:2:1, and all threads optimally complete at the same time.

Since the NCUs 2201-2203 present themselves as hardware contexts, software runtimes can schedule work as though they are just another SMT hardware thread. The existing memory model guarantees for SMTs are automatically extended for the NCUs.

As shown in FIG. 24, a runtime scheduler 2450 (e.g., an OpenMP scheduler) can query the "relative" compute strengths of the NCUs 2201-2203 to determine an appropriate subdivision of work. The runtime scheduler 2450 can then divide work appropriately and dispatch work across any chosen subset of NCUs 2201-2203 by setting appropriate affinities for threads (and without requiring a programmer to explicitly manage the division of work). Since moving data between caches is automatically handled by the cache flows in the cores, there is no need for explicit data alignment or placement. There also is no need for software managed buffers or scheduling data marshalling actions.

Exposing NCUs such as NCU 2203 near the L3 cache 2403 as "owners/sharers" allows efficient data sharing replication between L3 slices and cuts down on mesh data traffic. As mentioned, cache allocation hardware logic 2440 may assign a specified number of cache ways 2415 to the attached NCU 2203. Thus, these embodiments allow programmers to use existing familiar programming frameworks including cache allocation technology (CAT) while leveraging the TSO memory model of x86 processors. These implementations enable unlocking of performance from parallel work, optimally using the cache bandwidth across all cache levels.

The hardware and software used in various embodiments of the invention are set forth in Table A below.

TABLE A

| Topic | Architecture Support |
|---|---|
| Near Distributed LLC | Use existing ReservedWays in LLC to create a "local" cache. |
| Coherence | New CoreValid bits per near-LLC compute in the Snoop Filter. New CoreValid bit in the MLC (for ownership between DCU and MLC). |
| Virtual Memory | New small 4-6 entry local Translation Cache (TC) @ NCU. Snoop MEU TLB for misses. |
| Speculation | LSX unroll/execute only launched non-speculatively. No speculation within the NCU. |
| Memory Ordering | Full total store ordering support. No ordering across NCU (diff. threads), in-order load/store within NCU. Extra in-order execution between NCU, non-NCU. |
| Interrupt-ability | Bounded program state (#LSX instrs., num loops). |
| Software Support | |
| DNN Frameworks | Set KMP_THREAD_AFFINITY appropriately for each primitive. |
| High Performance Library (MKL-DNN) | Use LSX for tensor load, store, compute instructions. |
| Threading Runtime (OpenMP, TBB) | Split chunks of work as per the width of compute in each NCU. |

Cycle-accurate multi-core simulations were performed, modeling a state-of-the-art Intel 28 core datacenter processor (2nd Generation Intel® Xeon® Scalable Processors, formerly Cascade Lake) but with 4-way SMT. This baseline supports a peak 128 (2*64) MACs/cycle/core of compute (similar to Intel DL-Boost) with per-core on-die cache bandwidth including two 64B read ports at L1, two 64B read/write ports at L2 and one 64B read/write port at L3. Evaluations were performed for a sweep of compute sizes listed in Table B.

TABLE B

| Name | MACs/Cycle/Core | Details |
|---|---|---|
| M128, M256, M320, M512, M640 | 128, 256, 320, 512, 640 respectively | M128 is the baseline core, where all MAC compute is inside the core and data is sourced from L1$ only. M256-M640 are configurations where the compute is scaled monolithically inside the core. |
| P256 | 256 | 128@L1, 64@L2, 64@L3 |
| P320 | 320 | 128@L1, 128@L2, 64@L3 |
| P512 | 512 | 256@L1, 128@L2, 128@L3 |
| P640 | 640 | 256@L1, 256@L2, 128@L3 |

Six DNN topologies were evaluated end-to-end including ResNet-50, DenseNet-169, MobileNet, ResNext-101, Transformer and TwoStream. Of these, Transformer comprises solely of inner-product layers while the others have mostly convolution layers. The latest open source oneDNN v1.0 and the Intel C++ compiler 19.0 were used. Note that these are full system (including DRAM), multi-core evaluations. Since int8 inference was studied, most model weights fit in caches. Coupled with high reuse, overall impact on performance and power from DRAM is very low. These workloads were parallelized using the OpenMP multithreading framework using static asymmetric scheduling as described above.

For these workloads, the characterization showed that a 32-entry Code RF 2302, a 6-entry Translation Cache 2315, a 8-entry load/store queue 2305, a 8-entry compute queue 2330, and a 48-entry data register file 2326 are sufficient. A Verilog implementation of such an NCU instance was synthesized which is capable of 256 MACs/cycle/NCU using TSMC 28 nm library, setting a target clock of 1 GHz, using Synopsys Design Compiler. The total area per TFU is 0.38 mm2 and the detailed breakup is given in Table C. An additional 2 KB/core of storage was used for new core-valid bits in L2 and L3 for full coherence.

TABLE C

| Registers | MACs | TC, Queues, Control |
|---|---|---|
| 0.15 mm$^2$ | 0.17 mm$^2$ | 0.06 mm$^2$ |

Total Bytes: 3184.
Total Area = 0.38 mm$^2$

The total area overhead is the sum of this coherence storage and the area required for three TFUs/core. Projecting the total overhead to the 14 nm technology, a conservative estimate of the overall overhead is 2.63% of a single Xeon core.

The distribution of processing different machine-learning layers in different NCUs is shown in Table D. Convolution operations can be dispatched to any NCUs, inner products are dispatched to L2 and L3 NCUs, while pooling and concat operations are limited to L3 NCUs. ReLU operations are fused with other layers and are therefore distributed across the NCUs.

TABLE D

| Layer | Dispatch |
|---|---|
| Convolution | All NCUs |
| Inner Product | NCU@L2 and NCU@L3 only |
| Pooling | NCU@L3 only |
| Concat | NCU@L3 only |
| ReLU | Fused with other layers |

Figure 25:
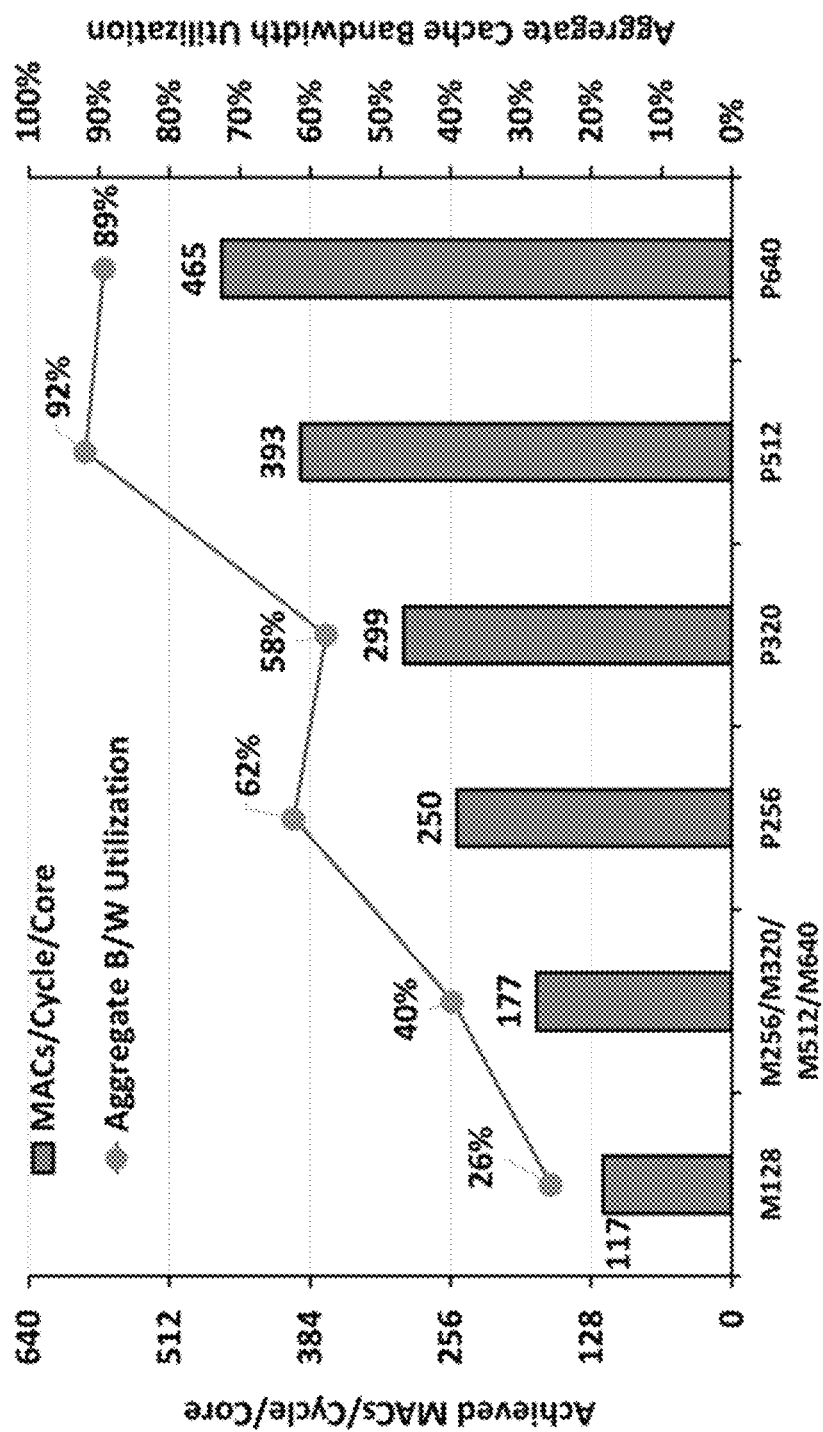
FIG. 25 illustrates the impact of using the embodiments of the invention on ResNet50 convolutional layers.

FIG. 25 illustrates the impact of using the embodiments of the invention on ResNet50 convolutional layers. The baseline (M128) is able to achieve average performance of 117 MACs/Cycle/Core across all ResNet50 layers. Monolithically scaling the compute by 2× achieves 177 MACs/Cycle/Core (a 1.51× increase in performance). However, scaling resources beyond M256 does not provide any performance boost as the core becomes L1$-bandwidth limited, even though the overall bandwidth usage is only 40%. However, distributing the compute to NCUs near L1, L2 and L3 improves performance linearly. The overall system cache bandwidth (across L1, L2 and L3) is saturated at the P640 point resulting in a 2.62× increase (465/177) for the same amount of compute resources.

End-to-end evaluations of this embodiment were performed on the six workloads. For different layers in these network models, the work distribution shown in FIG. 25 was used. The distribution is chosen to minimize the overall data movement within each layer.

Figure 26:
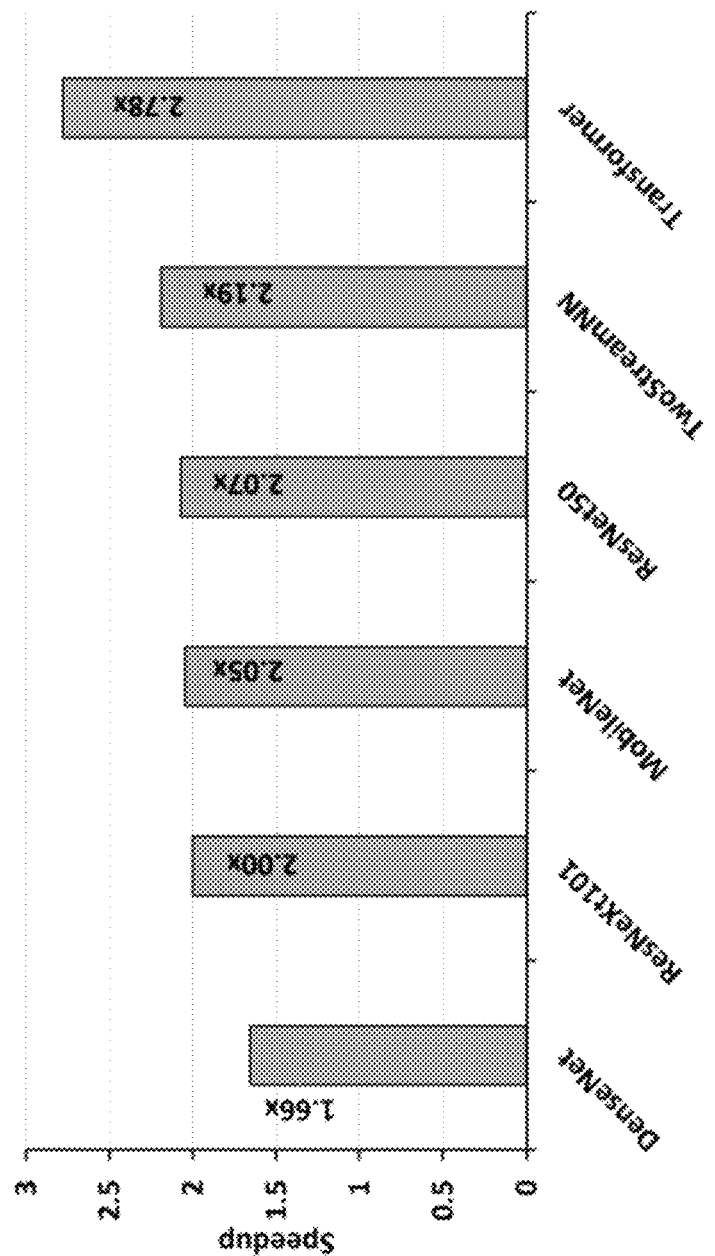
FIGS. 26-27 illustrate performance results of a test configuration.
Figure 27:
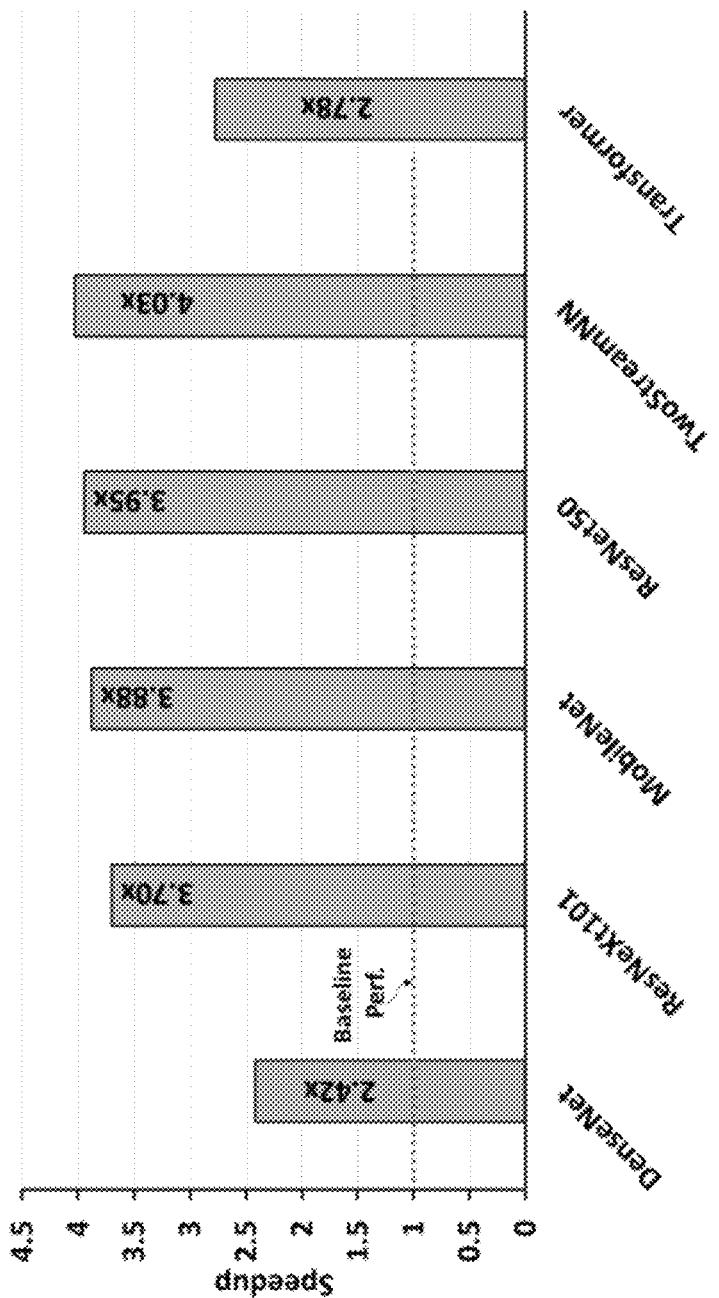

Performance of P256 and P640 configurations over the M128 configuration are shown in FIG. 26 and FIG. 27, respectively. With P256 configuration, the hardware resources are doubled with respect to M128, but are distributed across cache levels. Every workload gives greater than 2× improvement for 2λ the resources of M128, except DenseNet, which only gives a 1.66× performance improvement. For P640 (with 5× the resources of M128, but distributed across NCUs), there is a 2.41×-4.03× performance improvement in the workloads, as shown in FIG. 27.

EXAMPLES

The following are example implementations of different embodiments of the invention.

Example 1. A processor comprising: a plurality of cores including a first core to simultaneously process instructions of a plurality of threads; a cache hierarchy coupled to the first core and the memory, the cache hierarchy comprising a Level 1 (L1) cache, a Level 2 (L2) cache, and a Level 3 (L3) cache; and a plurality of compute units coupled to the first core including a first compute unit associated with the L1 cache, a second compute unit associated with the L2 cache, and a third compute unit associated with the L3 cache, wherein the first core is to offload instructions for execution by the compute units, the first core to offload instructions from a first thread to the first compute unit, instructions from a second thread to the second compute unit, and instructions from a third thread to the third compute unit.

Example 2. The processor of example 1 wherein the instructions offloaded by the core comprise instructions associated with structured, repetitive loops with a plurality of iterations.

Example 3. The processor of example 1 wherein the first compute unit is bound exclusively to the first thread, the second compute unit is bound exclusively to the second thread, and the third compute unit is bound exclusively to the third thread, and wherein the first core is to process instructions from each of the first thread, second thread, and third thread.

Example 4. The processor of example 3 wherein a compute unit of the first compute unit, second compute unit, and third compute unit comprises: a code register file comprising a first plurality of entries to store instructions to be executed by the compute unit; a scheduler to schedule the instructions for execution; a data register file comprising a second plurality of entries to store data associated with the instructions; and compute circuitry to execute the instructions and store results in the data register file.

Example 5. The processor of example 4 wherein the compute unit further comprises: an address generation unit (AGU) to determine virtual addresses required by the compute circuitry to execute the instructions; and a translation cache (TC) to store translations from the virtual addresses to physical addresses of system memory accessible by the first core.

Example 6. The processor of example 5 further comprising: an in-order compute issue queue coupled between the scheduler and the compute circuitry and configured to store compute instructions scheduled by the scheduler for execution by the compute circuitry.

Example 7. The processor of example 5 further comprising: an in-order load/store issue queue coupled between the scheduler and the AGU and configured to store load/store instructions scheduled by the scheduler for processing by the AGU.

Example 8. The processor of example 1 wherein the first compute unit is to directly access the L1 cache and not directly access the L2 cache or the L3 cache; the second compute unit is to directly access the L2 cache and not directly access the L1 cache or L3 cache; and the third compute unit is to directly access the L3 cache and not directly access the L1 cache or L2 cache.

Example 9. The processor of example 8 further comprising: cache allocation hardware logic to allocate a specified portion of the L3 cache to the third compute unit.

Example 10. The processor of example 8 wherein the L2 cache is to store a first plurality of cache lines, each cache line to include a bit to indicate whether the cache line is owned by the L2 cache or the L1 cache.

Example 11. The processor of claim 2 wherein the instructions offloaded by the core comprise instructions to perform matrix operations and matrix-vector operations.

Example 12. The processor of example 2 wherein the instructions offloaded by the core comprise instructions of a Deep Neural Network kernel.

Example 13. A system comprising: a memory to store instructions of a plurality of threads; a plurality of cores including a first core to simultaneously process instructions of a plurality of threads; a cache hierarchy coupled to the first core and the memory, the cache hierarchy comprising a Level 1 (L1) cache, a Level 2 (L2) cache, and a Level 3 (L3) cache; and a plurality of compute units coupled to the first core including a first compute unit associated with the L1 cache, a second compute unit associated with the L2 cache, and a third compute unit associated with the L3 cache, wherein the first core is to offload instructions for execution by the compute units, the first core to offload instructions from a first thread to the first compute unit, instructions from a second thread to the second compute unit, and instructions from a third thread to the third compute unit.

Example 14. The system of example 13 wherein the instructions offloaded by the core comprise instructions associated with structured, repetitive loops with a plurality of iterations.

Example 15. The system of example 13 wherein the first compute unit is bound exclusively to the first thread, the second compute unit is bound exclusively to the second thread, and the third compute unit is bound exclusively to the third thread, and wherein the first core is to process instructions from each of the first thread, second thread, and third thread.

Example 16. The system of example 15 wherein a compute unit of the first compute unit, second compute unit, and third compute unit comprises: a code register file comprising a first plurality of entries to store instructions to be executed by the compute unit; a scheduler to schedule the instructions for execution; a data register file comprising a second plurality of entries to store data associated with the instructions; and compute circuitry to execute the instructions and store results in the data register file.

Example 17. The system of example 16 wherein the compute unit further comprises: an address generation unit (AGU) to determine virtual addresses required by the compute circuitry to execute the instructions; and a translation cache (TC) to store translations from the virtual addresses to physical addresses of system memory accessible by the first core.

Example 18. The system of example 17 further comprising: an in-order compute issue queue coupled between the scheduler and the compute circuitry and configured to store compute instructions scheduled by the scheduler for execution by the compute circuitry.

Example 19. The system of example 17 further comprising: an in-order load/store issue queue coupled between the scheduler and the AGU and configured to store load/store instructions scheduled by the scheduler for processing by the AGU.

Example 20. The system of example 13 wherein the first compute unit is to directly access the L1 cache and not directly access the L2 cache or the L3 cache; the second compute unit is to directly access the L2 cache and not directly access the L1 cache or L3 cache; and the third compute unit is to directly access the L3 cache and not directly access the L1 cache or L2 cache.

Example 21. The system of example 20 further comprising: cache allocation hardware logic to allocate a specified portion of the L3 cache to the third compute unit.

Example 22. The system of example 20 wherein the L2 cache is to store a first plurality of cache lines, each cache line to include a bit to indicate whether the cache line is owned by the L2 cache or the L1 cache.

Example 23. The system of example 14 wherein the instructions offloaded by the core comprise instructions to perform matrix operations and matrix-vector operations.

Example 24. The system of example 14 wherein the instructions offloaded by the core comprise instructions of a Deep Neural Network kernel.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
    a plurality of cores including a first core to simultaneously process instructions of a plurality of threads;
    a cache hierarchy coupled to the first core and the memory, the cache hierarchy comprising a Level 1 (L1) cache, a Level 2 (L2) cache, and a Level 3 (L3) cache; and
    a plurality of compute units coupled to the first core including a first compute unit associated with the L1 cache, a second compute unit associated with the L2 cache, and a third compute unit associated with the L3 cache,
    wherein the first core is to offload instructions for execution by the compute units, the first core to offload instructions from a first thread to the first compute unit, instructions from a second thread to the second compute unit, and instructions from a third thread to the third compute unit.

2. The processor of claim 1 wherein the instructions offloaded by the core comprise instructions associated with structured, repetitive loops with a plurality of iterations.

3. The processor of claim 2 wherein the instructions offloaded by the core comprise instructions to perform matrix operations and matrix-vector operations.

4. The processor of claim 2 wherein the instructions offloaded by the core comprise instructions of a Deep Neural Network kernel.

5. The processor of claim 1 wherein the first compute unit is bound exclusively to the first thread, the second compute unit is bound exclusively to the second thread, and the third compute unit is bound exclusively to the third thread, and wherein the first core is to process instructions from each of the first thread, second thread, and third thread.

6. The processor of claim 5 wherein a compute unit of the first compute unit, second compute unit, and third compute unit comprises:
    a code register file comprising a first plurality of entries to store instructions to be executed by the compute unit;
    a scheduler to schedule the instructions for execution;
    a data register file comprising a second plurality of entries to store data associated with the instructions; and
    compute circuitry to execute the instructions and store results in the data register file.

7. The processor of claim 6 wherein the compute unit further comprises:
    an address generation unit (AGU) to determine virtual addresses required by the compute circuitry to execute the instructions; and
    a translation cache (TC) to store translations from the virtual addresses to physical addresses of system memory accessible by the first core.

8. The processor of claim 7 further comprising:
    an in-order compute issue queue coupled between the scheduler and the compute circuitry and configured to store compute instructions scheduled by the scheduler for execution by the compute circuitry.

9. The processor of claim 7 further comprising:
    an in-order load/store issue queue coupled between the scheduler and the AGU and configured to store load/store instructions scheduled by the scheduler for processing by the AGU.

10. The processor of claim 1 wherein the first compute unit is to directly access the L1 cache and not directly access the L2 cache or the L3 cache; the second compute unit is to directly access the L2 cache and not directly access the L1 cache or L3 cache; and the third compute unit is to directly access the L3 cache and not directly access the L1 cache or L2 cache.

11. The processor of claim 10 further comprising:
    cache allocation hardware logic to allocate a specified portion of the L3 cache to the third compute unit.

12. The processor of claim 10 wherein the L2 cache is to store a first plurality of cache lines, each cache line to include a bit to indicate whether the cache line is owned by the L2 cache or the L1 cache.

13. A system comprising:
    a memory to store instructions of a plurality of threads;
    a plurality of cores including a first core to simultaneously process instructions of a plurality of threads;
    a cache hierarchy coupled to the first core and the memory, the cache hierarchy comprising a Level 1 (L1) cache, a Level 2 (L2) cache, and a Level 3 (L3) cache; and
    a plurality of compute units coupled to the first core including a first compute unit associated with the L1 cache, a second compute unit associated with the L2 cache, and a third compute unit associated with the L3 cache,
    wherein the first core is to offload instructions for execution by the compute units, the first core to offload instructions from a first thread to the first compute unit, instructions from a second thread to the second compute unit, and instructions from a third thread to the third compute unit.

14. The system of claim 13 wherein the instructions offloaded by the core comprise instructions associated with structured, repetitive loops with a plurality of iterations.

15. The system of claim 14 wherein the instructions offloaded by the core comprise instructions to perform matrix operations and matrix-vector operations.

16. The system of claim 14 wherein the instructions offloaded by the core comprise instructions of a Deep Neural Network kernel.

17. The system of claim 13 wherein the first compute unit is bound exclusively to the first thread, the second compute unit is bound exclusively to the second thread, and the third compute unit is bound exclusively to the third thread, and wherein the first core is to process instructions from each of the first thread, second thread, and third thread.

18. The system of claim 17 wherein a compute unit of the first compute unit, second compute unit, and third compute unit comprises:
    a code register file comprising a first plurality of entries to store instructions to be executed by the compute unit;
    a scheduler to schedule the instructions for execution;
    a data register file comprising a second plurality of entries to store data associated with the instructions; and
    compute circuitry to execute the instructions and store results in the data register file.

19. The system of claim 18 wherein the compute unit further comprises:
    an address generation unit (AGU) to determine virtual addresses required by the compute circuitry to execute the instructions; and
    a translation cache (TC) to store translations from the virtual addresses to physical addresses of system memory accessible by the first core.

20. The system of claim 19 further comprising:
    an in-order compute issue queue coupled between the scheduler and the compute circuitry and configured to store compute instructions scheduled by the scheduler for execution by the compute circuitry.

21. The system of claim 19 further comprising:
an in-order load/store issue queue coupled between the scheduler and the AGU and configured to store load/store instructions scheduled by the scheduler for processing by the AGU.

22. The system of claim 13 wherein the first compute unit is to directly access the L1 cache and not directly access the L2 cache or the L3 cache; the second compute unit is to directly access the L2 cache and not directly access the L1 cache or L3 cache; and the third compute unit is to directly access the L3 cache and not directly access the L1 cache or L2 cache.

23. The system of claim 22 further comprising:
cache allocation hardware logic to allocate a specified portion of the L3 cache to the third compute unit.

24. The system of claim 22 wherein the L2 cache is to store a first plurality of cache lines, each cache line to include a bit to indicate whether the cache line is owned by the L2 cache or the L1 cache.

\* \* \* \* \*